US012596953B2

(12) United States Patent 
Senior et al.

(10) Patent No.: US 12,596,953 B2 
(45) Date of Patent: *Apr. 7, 2026

(54) QUANTUM ERROR CORRECTION USING NEURAL NETWORKS

(71) Applicant: Google LLC, Mountain View, CA (US)

(72) Inventors: Andrew W. Senior, London (GB); Francisco Javier Hernandez Heras, London (GB); Thomas Bastian Edlich, London (GB); Alexander James Davies, London (GB); Johannes Karl Richard Bausch, Cambridge (GB); Yuezhen Niu, El Segundo, CA (US)

(73) Assignee: Google LLC, Mountain View, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/237,204

(22) Filed: Aug. 23, 2023

(65) Prior Publication Data

US 2025/0068953 A1 Feb. 27, 2025

(51) Int. Cl.
G06F 11/00 (2006.01)
G06N 10/70 (2022.01)
(52) U.S. Cl.
CPC .................................. G06N 10/70 (2022.01)
(58) Field of Classification Search
CPC ............. G06F 11/0721; G06F 11/0793; G06F 11/0772; G06F 11/0775; G06F 11/0784; G06F 11/0787
See application file for complete search history.

(56) References Cited

U.S. PATENT DOCUMENTS

2025/0068954 A1 2/2025 Senior et al.
2025/0068955 A1 2/2025 Senior et al.

OTHER PUBLICATIONS

Choukroun et al., Deep Quantum Error Correction, Jan. 27, 2023, https://arxiv.org/abs/2301.11930v1, 11 pages (Year: 2023).*
Baireuther et al., "Machine-learning-assisted correction of correlated qubit errors in a topological code," arXiv, Jan. 17, 2018, 10 pages.
Google Quantum AI, "Suppressing quantum errors by scaling a surface code logical qubit," Nature, Feb. 22, 2023, 7 pages.
Pattison et al., "Improved quantum error correction using soft information," arXiv, Jul. 28, 2021, 27 pages.
Quantumai.google [online], "Our quantum error correction milestone," Feb. 22, 2023, retrieved on Aug. 31, 2023, retrieved from URL<https://quantumai.google/qecmilestone>, 4 pages.

(Continued)

*Primary Examiner* — Katherine Lin
(74) *Attorney, Agent, or Firm* — Fish & Richardson P.C.

(57) ABSTRACT

Methods, systems, and apparatus, including computer programs encoded on computer storage media, for detecting errors in a computation performed by a quantum computer. In one aspect, a method comprises obtaining error correction data for each of a plurality of time steps during the computation; initializing a decoder state; and for each of the plurality of time steps: generating an intermediate representation; and processing a time step input through a Transformer neural network to update the decoder state for the time step. The method comprises generating a prediction of whether an error occurred in the computation from the decoder state for the last time step of the plurality of time steps.

25 Claims, 12 Drawing Sheets

(56) References Cited

OTHER PUBLICATIONS

Varbanov et al., "Neural network decoder for near-term surface-code experiments," arXiv, Jul. 6, 2023, 15 pages.

Aharonov et al., "Fault-Tolerant Quantum Computation with Long-Range Correlated Noise," Physical Review Letters, Feb. 2006, 96:050504, 1-4.

Ali et al., "Reducing the error rate of a superconducting logical qubit using analog readout information," CoRR, Submitted on Aug. 30, 2024, arXiv:2403.00706v2, pp. 1-19.

Andreasson et al., "Quantum error correction for the toric code using deep reinforcement learning," Quantum, Sep. 2019, 3:1-12.

Arute et al., "Quantum supremacy using a programmable superconducting processor," Nature, Oct. 2019, 574:505-511.

Aspuru-Guzik et al., "Simulated Quantum Computation of Molecular Energies," Science, Sep. 2005, 309(5741):1704-1707.

Baireuther et al., "Machine-learning-assisted correction of correlated qubit errors in a topological code," Quantum, Jan. 2018, 2:1-10.

Baireuther et al., "Neural network decoder for topological color codes with circuit level noise," New Journal of Physics, Jan. 2019, 21:013003, 1-12.

Bausch et al., "Learning to Decode the Surface Code with a Recurrent, Transformer-Based Neural Network," CoRR, Submitted on Oct. 9, 2023, arXiv:2310.05900v1, pp. 1-68.

Bausch, "Recurrent Quantum Neural Networks," Paper, Presented at the 34th Conference on Neural Information Processing Systems, Virtual Event, Dec. 6-12, 2020; Advances in Neural Information Processing Systems 33, Jul. 2021, pp. 1-12.

Bennett et al., "Quantum cryptography: Public key distribution and coin tossing," Theoretical Computer Science, Dec. 2014, 560:7-11.

Biamonte et al., "Quantum machine learning," Nature, Sep. 2017, 549:195-202.

Blais et al., "Cavity quantum electrodynamics for superconducting electrical circuits: An architecture for quantum computation," Physical Review Letters, Jun. 2004, 69:062320, 1-14.

Bombin et al., "Optimal resources for topological two-dimensional stabilizer codes: Comparative study," Physical Review A, Jul. 2007, 76:012305, 1-6.

Bonilla Ataides et al., "The XZZX surface code," Nature Communications, 2021, 12:2172, 1-12.

Bravyi et al., "Efficient algorithms for maximum likelihood decoding in the surface code," Physical Review A, Sep. 2014, 90:032326, 1-15.

Bravyi et al., "Magic-state distillation with low overhead," Physical Review A, Nov. 2012, 86:052329, 1-10.

Bravyi et al., "Quantum codes on a lattice with boundary," CoRR, Submitted on Nov. 20, 1998, arXiv:quant-ph/9811052v1, pp. 1-6.

Bravyi et al., "Universal quantum computation with ideal Clifford gates and noisy ancillas," Physical Review A, Feb. 2005, 71:022316, 1-14.

Breiman, "Random Forests," Machine learning, Oct. 2001, 45:5-32.

Brown et al., "Language Models are Few-Shot Learners," Paper, Presented at the 34th Conference on Neural Information Processing Systems, Virtual Event, Dec. 6-12, 2020; Advances in Neural Information Processing Systems 33, Jul. 2021, pp. 1-25.

Campbell et al., "Roads towards fault-tolerant universal quantum computation," Nature, Sep. 2017, 549:172-179.

Chamberland et al., "Deep neural decoders for near term fault-tolerant experiments," Quantum Science and Technology, Oct. 2018, 3:044002, 1-32.

Chen et al., "Symbolic discovery of optimization algorithms," Paper, Presented at the 37th Conference on Neural Information Processing Systems, New Orleans, LA, Dec. 10-16, 2023; Advances in Neural Information Processing Systems 36, Jul. 2024, pp. 1-29.

Choukroun et al., "Deep Quantum Error Correction," CoRR, Submitted on Jan. 27, 2023, arXiv:2301.11930v1, 11 pages.

Data-Science-Blog.com [online], "Multi-head attention mechanism: "queries", "keys", and "values," over and over again," Apr. 7, 2021, retrieved on Feb. 26, 2025, retrieved from URL <https://data-science-blog.com/blog/2021/04/07/multi-head-attention-mechanism/>, 26 pages.

Egan et al., "Fault-tolerant control of an error-corrected qubit," Nature, Oct. 2021, 598:281-286, 9 pages.

Egorov et al., "The END: An Equivariant Neural Decoder for Quantum Error Correction," CoRR, Submitted on Apr. 14, 2023, arXiv:2304.07362v1, pp. 1-14.

Ekert, "Quantum cryptography based on Bell's theorem," Physical Review Letters, Aug. 1991, 67(6):661-663.

Farhi et al., "A Quantum Adiabatic Evolution Algorithm Applied to Random Instances of an NP-Complete Problem," Science, Apr. 2001, 292(5516):472-476.

Feynman, "Quantum Mechanical Computers," Optical News, 1985, 11(2):11-20.

Feynman, "Simulating physics with computers," International Journal of Theoretical Physics, Jun. 1982, 21(6/7):467-488.

Fitzek et al., "Deep Q-learning decoder for depolarizing noise on the toric code," Physical Review Research, May 2020, 2:023230, 1-17.

Fowler et al., "Surface codes: Towards practical large-scale quantum computation," Physical Review A, Sep. 2012, 86:032324, 1-48.

Fowler, "Optimal complexity correction of correlated errors in the surface code," CoRR, Submitted on Oct. 2, 2013, arXiv:1310.0863v1, pp. 1-6.

Ghosh et al., "Understanding the effects of leakage in superconducting quantum-error-detection circuits," Physical Review A, Dec. 2013, 88:062329, 1-7.

Gicev et al., "A scalable and fast artificial neural network syndrome decoder for surface codes," CoRR, Submitted on Dec. 10, 2021, arXiv:2110.05854v2, pp. 1-55.

Gidney et al., "A Fault-Tolerant Honeycomb Memory," Quantum, Dec. 2021, 5:1-17.

Gidney et al., "How to factor 2048 bit RSA integers in 8 hours using 20 million noisy qubits," Quantum, Apr. 2021, 5:1-31.

Gidney, "Stim: a fast stabilizer circuit simulator," Quantum, Jun. 2021, 5:1-26.

Github.com [online], "Haiku: Sonnet for JAX," 2020, retrieved on Feb. 24, 2025, retrieved from URL <http://github.com/deepmind/dm-haiku>, 11 pages.

Google Quantum AI, "Exponential suppression of bit or phase errors with cyclic error correction," Nature, Jul. 2021, 595:383-387, 6 pages.

Grosshans et al., "Continuous Variable Quantum Cryptography Using Coherent States," Physical Review Letters, Feb. 2002, 88(5):057902, 1-4.

Grover, "A fast quantum mechanical algorithm for database search," Paper, Presented at Proceedings of the ACM Conference: Symposium on Theory of Computing, Philadelphia, PA, May 22-24, 1996, pp. 212-219.

Gupta et al., "Encoding a magic state with beyond break-even fidelity," CoRR, Submitted on May 23, 2023, arXiv:2305.13581v1, pp. 1-10.

Higgott et al., "Fragile boundaries of tailored surface codes and improved decoding of circuit-level noise," CoRR, Submitted on Jul. 7, 2022, arXiv:2203.04948v4, pp. 1-17.

Higgott et al., "Sparse Blossom: correcting a million errors per core second with minimum-weight matching," CoRR, Submitted on Mar. 28, 2023, arXiv:2303.15933v1, pp. 1-34.

Higgott, "PyMatching: A Python package for decoding quantum codes with minimum-weight perfect matching," CoRR, Submitted on Jul. 12, 2021, arXiv:2105.13082v2, pp. 1-15.

Hinton et al., "Distilling the Knowledge in a Neural Network," CoRR, Submitted on Mar. 9, 2015, arXiv:1503.02531v1, pp. 1-9.

International Search Report and Written Opinion in International Appln. No. PCT/US2024/036110, mailed on Nov. 15, 2024, 16 pages.

International Search Report and Written Opinion in International Appln. No. PCT/US2024/036167, mailed on Oct. 30, 2024, 15 pages.

Jeffrey et al., "Fast Accurate State Measurement with Superconducting Qubits," Physical Review Letters, May 2014, 112:190504, 1-5.

Jumper et al., "Highly accurate protein structure prediction with AlphaFold," Nature, Jul. 2021, 596:583-589.

(56) References Cited

OTHER PUBLICATIONS

Kelly et al., "Scalable in situ qubit calibration during repetitive error detection," Physical Review A, Sep. 2016, 94:032321, 1-8.

Khezri et al., "Measurement-Induced State Transitions in a Superconducting Qubit: Within the Rotating Wave Approximation," CoRR, Submitted on Dec. 9, 2022, arXiv:2212.05097v1, pp. 1-12.

Kitaev, "Fault-tolerant quantum computation by anyons," Annals of Physics, Jan. 2003, 303(1):2-30.

Kitaev, "Quantum Error Correction with Imperfect Gates," Quantum Communication, Computing, and Measurement, Springer, Jul. 1997, Part II. Quantum Computing, pp. 181-188.

Krastanov et al., "Deep Neural Network Probabilistic Decoder for Stabilizer Codes," Scientific reports, Sep. 2017, 7:11003, 1-7.

Krinner et al., "Realizing repeated quantum error correction in a distance-three surface code," Nature, May 2022, 605:669-676.

Lange et al., "Data-driven decoding of quantum error correcting codes using graph neural networks," CoRR, Submitted on Jul. 3, 2023, arXiv:2307.01241v1, pp. 1-15.

Liu et al., "Neural Belief-Propagation Decoders for Quantum Error-Correcting Codes," Physical Review Letters, May 2019, 122:200501, 1-6.

Liyanage et al., "Scalable Quantum Error Correction for Surface Codes using FPGA," CoRR, Submitted on May 15, 2023, arXiv:2301.08419v2, pp. 1-12.

Lloyd, "Universal Quantum Simulators," Science, Aug. 1996, 273(5278):1073-1078.

Luo et al., "Quantum teleportation of physical qubits into logical code spaces," PNAS, Sep. 2021, 118(36):e2026250118, 1-5.

Martyn et al., "Grand Unification of Quantum Algorithms," PRX Quantum, Dec. 2021, 2:040203, 1-40.

Matekole et al., "Decoding surface codes with deep reinforcement learning and probabilistic policy reuse," CoRR, Submitted on Dec. 22, 2022, arXiv:2212.11890v1, pp. 1-38.

Mcewen et al., "Removing leakage-induced correlated errors in superconducting quantum error correction," Nature Communications, Mar. 2021, 12(1761):1-7.

Meinerz et al., "Scalable Neural Decoder for Topological Surface Codes," Physical Review Letters, Feb. 2022, 128:080505, 1-6.

Miao et al., "Overcoming leakage in scalable quantum error correction," CoRR, Submitted on Nov. 9, 2022, arXiv:2211.04728v1, pp. 1-17.

Ni, "Neural Network Decoders for Large-Distance 2D Toric Codes," Quantum, Dec. 2020, 4:1-11.

Niu et al., "Learnability and Complexity of Quantum Samples," CoRR, Submitted on Oct. 22, 2020, arXiv:2010.11983v1, pp. 1-19.

O'Brien et al., "Density-matrix simulation of small surface codes under current and projected experimental noise," npj Quantum Information, Sep. 2017, 3(39):1-8.

Overwater et al., "Neural-Network Decoders for Quantum Error Correction Using Surface Codes: A Space Exploration of the Hardware Cost-Performance Tradeoffs," IEEE Transactions on Quantum Engineering, May 2022, 3:3101719, 20 pages.

Panteleev et al., "Degenerate Quantum LDPC Codes With Good Finite Length Performance," Quantum, Nov. 2021, 5:1-21.

Pattison et al., "Hierarchical memories: Simulating quantum LDPC codes with local gates," CoRR, Submitted on Mar. 8, 2023, arXiv:2303.04798v1, pp. 1-70.

Pearl, "Reverend Bayes on inference engines: A distributed hierarchical approach," Paper, Presented at Proceedings of the AAAI Conference: Conference on Artificial Intelligence, Pittsburgh, PA, Aug. 18-20, 1982; Probabilistic and Causal Inference: The Works of Judea Pearl, Feb. 2022, pp. 133-136.

Poulin, "Optimal and efficient decoding of concatenated quantum block codes," Physical Review A, Nov. 2006, 74:052333, 1-5.

Reiher et al., "Elucidating reaction mechanisms on quantum computers," PNAS, Jul. 2017, 114(29):7555-7560.

Ryan-Anderson et al., "Realization of Real-Time Fault-Tolerant Quantum Error Correction," Physical Review X, Dec. 2021, 11:041058, 1-29.

Sank et al., "Measurement-Induced State Transitions in a Superconducting Qubit: Beyond the Rotating Wave Approximation," Physical Review Letters, Nov. 2016, 117:190503, 1-6.

Sank, "Fast, Accurate State Measurement in Superconducting Qubits," Thesis for the degree of Doctor of Philosophy in Physics, University of California, Santa Barbara, Sep. 2014, pp. 1-212, 230 pages.

Schäfer et al., "Fast quantum logic gates with trapped-ion qubits," Nature, Mar. 2018, 555:75-78, 6 pages.

Schuld et al., "An introduction to quantum machine learning," Contemporary Physics, 2015, 56(2):172-185.

Shazeer, "GLU Variants Improve Transformer," CoRR, Submitted on Feb. 12, 2020, arXiv:2002.05202v1, pp. 1-5.

Shor, "Polynomial-Time Algorithms for Prime Factorization and Discrete Logarithms on a Quantum Computer," Society for Industrial and Applied Mathematics Review, 1999, 41(2):303-332.

Shor, "Scheme for reducing decoherence in quantum computer memory," Physical Review A, Oct. 1995, 52:R2493, 4 pages.

Sivak et al., "Real-time quantum error correction beyond break-even," Nature, Apr. 2023, 616:50-55.

Skoric et al., "Parallel window decoding enables scalable fault tolerant quantum computation," CoRR, Submitted on Sep. 18, 2022, arXiv:2209.08552v1, pp. 1-12.

Suchara et al., "Leakage suppression in the Toric Code," Paper, Presented at Proceedings of the IEEE Conference: International Symposium on Information Theory, Hong Kong, China, Jun. 14-19, 2015, pp. 1119-1123.

Sundaresan et al., "Demonstrating multi-round subsystem quantum error correction using matching and maximum likelihood decoders," Nature Communications, May 2023, 14: 2852, 1-14.

Sundaresan et al., "Matching and maximum likelihood decoding of a multi-round subsystem quantum error correction experiment," CoRR, Submitted on Apr. 20, 2022, arXiv:2203.07205v2, pp. 1-15.

Sweke et al., "Reinforcement learning decoders for fault-tolerant quantum computation," Machine Learning: Science and Technology, Jun. 2021, 2(2):025005, 1-20.

Tan et al., "Scalable surface code decoders with parallelization in time," CoRR, Submitted on Sep. 29, 2022, arXiv:2209.09219v2, pp. 1-24.

Terhal, "Quantum error correction for quantum memories," Reviews of Modern Physics, Apr.-Jun. 2015, 87:307-346.

Torlai et al., "Neural Decoder for Topological Codes," Physical review letters, Jul. 2017, 119:030501, 1-5.

Tripathi et al., "Suppression of Crosstalk in Superconducting Qubits Using Dynamical Decoupling," Physical Review Applied, Aug. 2022, 18:024068, 1-24.

Varbanov et al., "Neural network decoder for near-term surface-code experiments," CoRR, Submitted on Oct. 23, 2023, arXiv:2307.03280v2, pp. 1-16.

Varsamopoulos et al., "Comparing Neural Network Based Decoders for the Surface Code," IEEE Transactions on Computers, Feb. 2020, 69(2):300-311.

Varsamopoulos et al., "Decoding surface code with a distributed neural network-based decoder," Quantum Machine Intelligence, Mar. 2020, 2:3, 1-12.

Vaswani et al., "Attention Is All You Need," CoRR. Submitted on Dec. 6, 2017, arXiv:1706.03762v5, pp. 1-15.

Versluis et al., "Scalable Quantum Circuit and Control for a Superconducting Surface Code," Physical Review Applied, Sep. 2017, 8:034021, 1-7.

Wagner et al., "Symmetries for a high-level neural decoder on the toric code," Physical Review A, Jul. 2020, 102:042411, 13 pages.

Waldherr et al., "Quantum error correction in a solid-state hybrid spin register," Nature, Feb. 2014, 506:204-207.

Wallraff et al., "Approaching Unit Visibility for Control of a Superconducting Qubit with Dispersive Readout," Physical Review Letters, Aug. 2005, 95:060501, 1-4.

You et al., "Large Batch Optimization for Deep Learning: Training BERT in 76 minutes," CoRR, Submitted on Sep. 25, 2019, arXiv:1904.00962v4, pp. 1-37.

Zalka, "Simulating quantum systems on a quantum computer," Proceedings of the Royal Society of London. Series A: Mathematical, Physical and Engineering Sciences, Jan. 1998, 454:313-322.

(56) References Cited

OTHER PUBLICATIONS

Zenodo.org [online], "Data for "Suppressing quantum errors by scaling a surface code logical qubit,"" Jul. 14, 2022, retrieved on Feb. 24, 2025, retrieved from URL <https://zenodo.org/record/6804040>, 5 pages.

Zhang et al., "A Scalable, Fast and Programmable Neural Decoder for Fault-Tolerant Quantum Computation Using Surface Codes," CoRR, Submitted on May 25, 2023, arXiv:2305.15767v1, pp. 1-14.

Zhao et al., "Realization of an Error-Correcting Surface Code with Superconducting Qubits," Physical Review Letters, Jul. 2022, 129:030501, 1-7.

* cited by examiner

300

Obtain error correction data
310

Initialize a decoder state
315

For each time step, generate an intermediate
representation
320

For each time step, process a time step input
through a Transformer neural network
330

Generate a prediction
340

500

570

560 PREDICTION NEURAL NETWORK

Prob(error)

$S_N$ STATE-UPDATING NEURAL NETWORK

Stabilizer Embedder $S_{N-1}$ STATE-UPDATING NEURAL NETWORK

Stabilizer Embedder $S_3$ STATE-UPDATING NEURAL NETWORK

Stabilizer Embedder $S_2$ STATE-UPDATING NEURAL NETWORK

Stabilizer Embedder $S_0$ STATE-UPDATING NEURAL NETWORK 550

Stabilizer Embedder

Zero

530

540

535

520

510

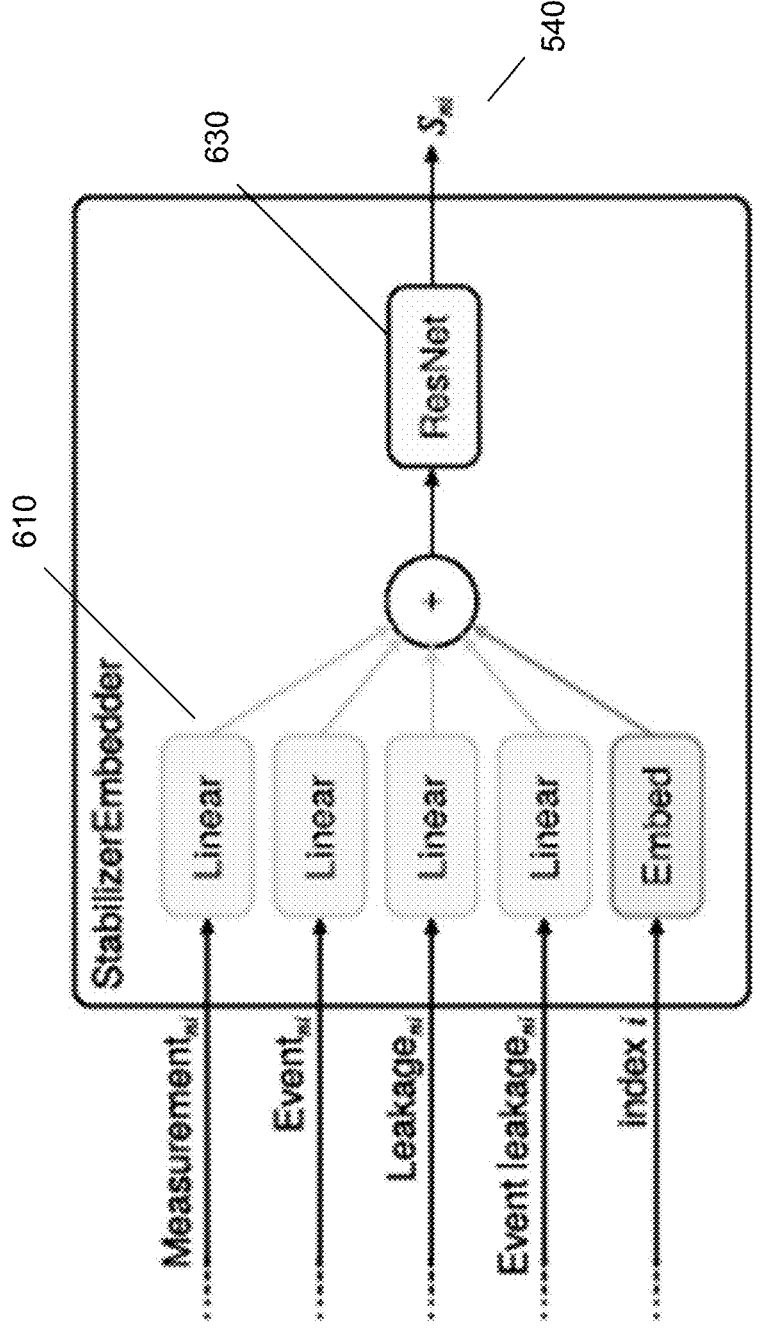
FIG. 6

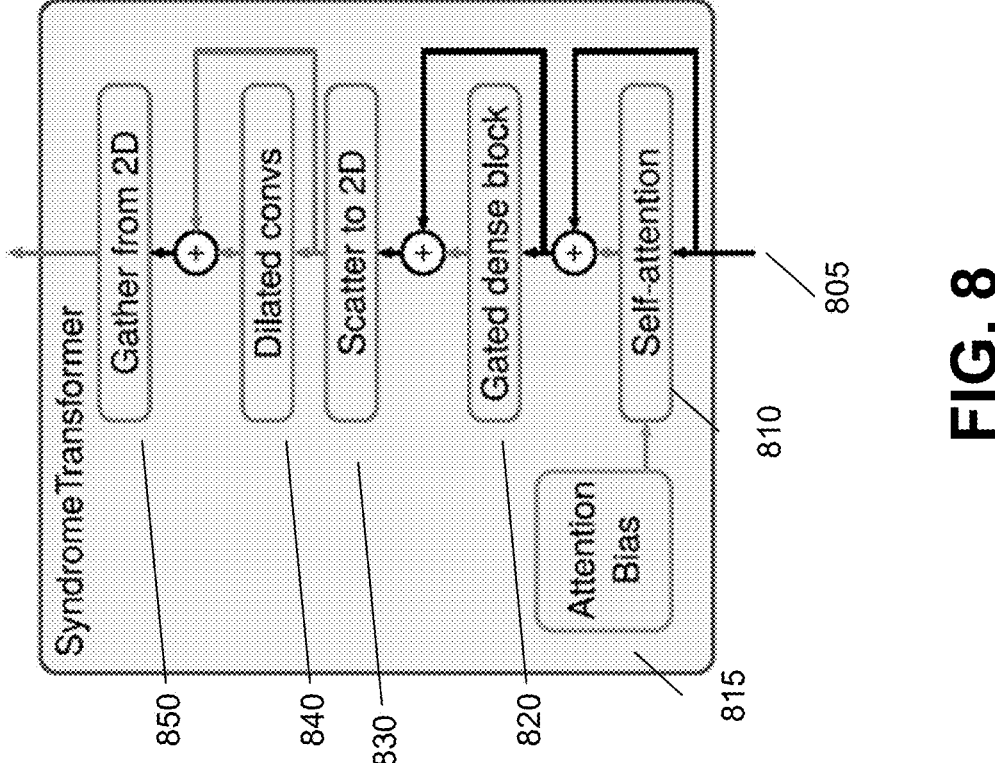
FIG. 8

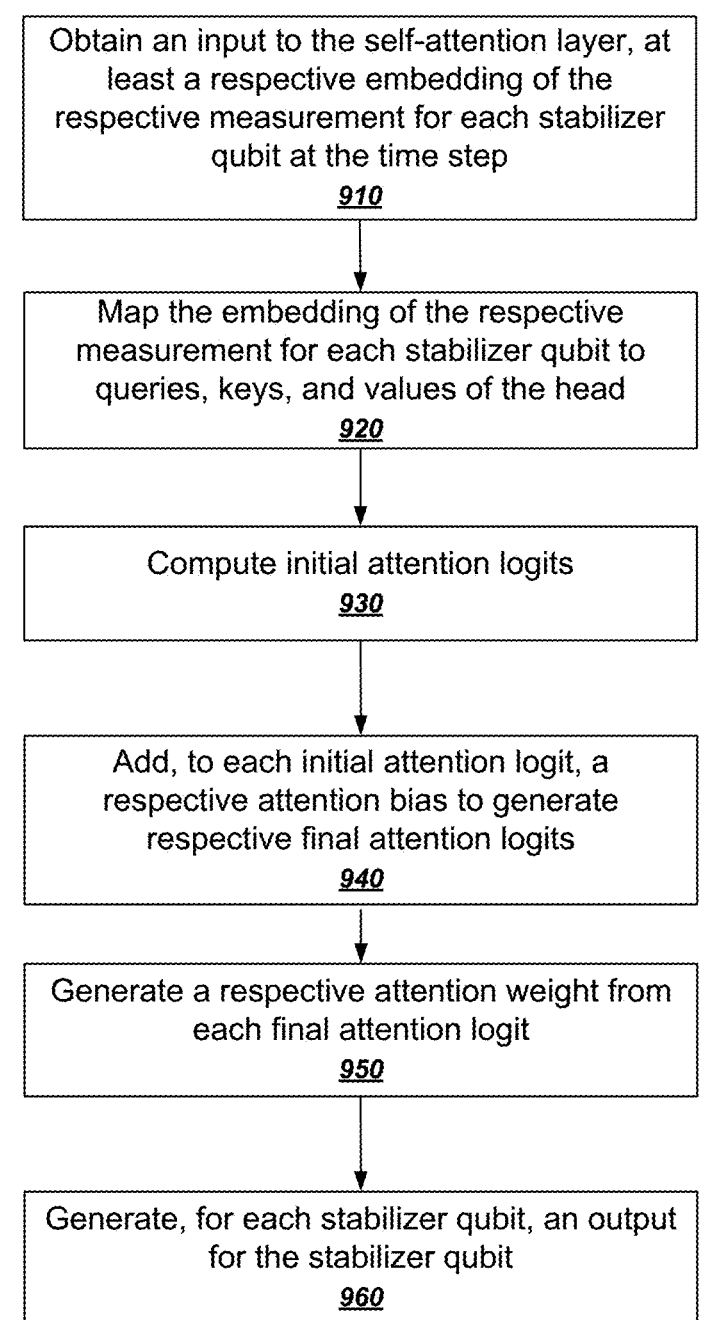

900

Obtain an input to the self-attention layer, at least a respective embedding of the respective measurement for each stabilizer qubit at the time step
910

Map the embedding of the respective measurement for each stabilizer qubit to queries, keys, and values of the head
920

Compute initial attention logits
930

Add, to each initial attention logit, a respective attention bias to generate respective final attention logits
940

Generate a respective attention weight from each final attention logit
950

Generate, for each stabilizer qubit, an output for the stabilizer qubit
960

Obtain error correction data
*1210*

Process error correction data using one or
more machine learning decoder models to
generate a prediction of whether an error
occurred in the computation
*1220*

QUANTUM ERROR CORRECTION USING NEURAL NETWORKS

BACKGROUND

This specification relates to quantum error correction using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes technologies for detecting errors in quantum computations such as the surface code. A grid of data qubits encodes a logical qubit. Stabilizer qubits located in between the grid of data qubits can be used to obtain stabilizer features such as parity checks on adjacent groups of data qubits. An error correction decoder can be trained to predict whether a logical error has occurred on a logical qubit, individually or as part of a quantum computation, using the history of stabilizer features.

Quantum computing provides a means to solve certain problems that cannot be solved in a reasonable period of time using conventional classical computers. These problems include factoring very large numbers into their primes and searching large, unstructured data sets. A number of physical systems are being explored for their use in quantum computing, including ions, spins in semiconductors, and superconducting circuits. However, none of these systems perform sufficiently well to serve directly as computational qubits. For example, spins in semiconductors cannot reliably encode and retain information for long enough to be useful.

Therefore, scalable quantum computers require quantum error correction. Classical error correction employs redundancy. For example, in the repetition code information is copied and stored multiple times. If the copies are later found to disagree, it can be determined that an error has occurred, and a majority vote can be taken to recover the information. Copying quantum information is not possible due to the no-cloning theorem. Therefore, quantum error correction codes spread the logical information of one qubit onto an entangled state of multiple data qubits. The multiple data qubits are collectively referred to as a logical qubit.

Surface codes are a family of quantum error correcting codes that are defined on a two-dimensional grid of data qubits. In the surface code, data qubits can be projected into the entangled code subspace using, for example, a sequence of CNOT operations or CZ gates, with subsequent measurements of the entangled states providing a means for error correction and error detection. A set of data qubits entangled in this way is used to define a logical qubit, which due to the entanglement and measurement has far better performance than the underlying data qubits. Measurements can be made of stabilizer qubits that each interact with neighboring data qubits to map data qubit parity onto stabilizer qubit states. These parity measurements can be laid out so that each one commutes with the logical observables of the encoded qubit as well as every other parity measurement. One of the advantages of surface codes is their relative tolerance to local errors. Surface codes can handle error rates of almost 3% per surface code clock cycle, which is less stringent than that of other quantum computing approaches. This error tolerance, along with the simple two-dimensional qubit layout, makes a surface code architecture a realistic approach to building a solid-state quantum computer. Other examples of quantum codes include stabilizer codes, color codes, and low-density parity-check codes.

Quantum codes exhibit degeneracy, where exponentially many configurations of errors may produce the same history of stabilizer features. Quantum circuits also induce rich noise models that include complicated effects that fall outside of widely-studied noise such as qubit or circuit level depolarizing noise. For example, a rich noise model can include cross-talk, long-range effects induced by imperfect shielding and tuning of the control machinery. The rich noise model can also include leakage, when the qubit is really a multi-level system, and can "leak" amplitude into a higher excited state outside of the computational basis (qubit excitations beyond the computational states $|0\rangle$ and $|1\rangle$ that are long-lived and mobile). Degeneracy, circuit-level correlations, leakage, and the difficulty in modeling these errors make it difficult for conventional decoders to detect errors.

Improving the performance of the decoder means that hardware requirements such as device fidelity or device size can be reduced. Thus an accurate decoder is vital to realizing a fault-tolerant quantum computer using plausibly noisy hardware and minimal hardware resources. The decoder must also be fast enough to keep up with the rate of measurement information produced by the quantum computer.

According to a first aspect there is provided a method for detecting errors in a computation performed by a quantum computer comprising a plurality of data qubits, the method comprising: obtaining error correction data for each of a plurality of time steps during the computation, the error correction data for each time step comprising a respective feature for each of a plurality of stabilizer qubits that each correspond to a respective subset of the data qubits for the time step; initializing a decoder state that represents information about the plurality of stabilizer qubits; and for each of the plurality of time steps: generating an intermediate representation comprising, for each of the stabilizer qubits, a respective embedding of the respective feature for the stabilizer qubit at the time step; and processing a time step input through a Transformer neural network to update the decoder state for the time step, wherein the time step input comprises the intermediate representation for the time step and the decoder state for a preceding time step; and generating a prediction of whether an error occurred in the computation from the decoder state for the last time step of the plurality of time steps.

In some implementations, the decoder state represents information about the plurality of data qubits.

In some implementations, the respective feature for each of the stabilizer qubits is an analog measurement of the corresponding subset of data qubits at the time step.

In some implementations, the respective feature for each of the stabilizer qubits comprises leakage data characterizing leakage of the corresponding subset of data qubits at the time step.

In some implementations, the respective feature for each of the stabilizer qubits comprises posterior probabilities of a stabilizer measurement given analog measurements of the corresponding subset of data qubits at the time step.

In some implementations, the respective feature for each of the stabilizer qubits comprises a time series of analog measurements of the corresponding subset of data qubits for a period of time ending at the time step.

In some implementations, the error correction data for each time step comprises stabilizer events for one or more of the stabilizer qubits at the time step.

In some implementations, generating an intermediate representation comprising, for each of the stabilizer qubits, a respective embedding of the respective feature for the stabilizer qubit at the time step comprises: generating the respective embeddings for the stabilizer qubits for the time step; obtaining a respective positional embedding for each stabilizer qubit characterizing a position of the stabilizer qubit within the quantum computer; and processing the respective embeddings of the stabilizer qubits and the respective positional embeddings for the stabilizer qubits using an encoding neural network to generate the intermediate representation for the time step.

In some implementations, generating a prediction of whether an error occurred in the computation from the decoder state for the last time step of the plurality of time steps comprises: generating, from the decoder state for the last time step, an input to a prediction neural network; and processing the input using the prediction neural network to generate a score that indicates whether an error occurred.

In some implementations, the Transformer neural network comprises one or more Transformer layers, and wherein each Transformer layer comprises a self-attention layer and a feed-forward layer.

In some implementations, each Transformer layer further comprises one or more convolutional layers that apply convolutions over a spatial grid of outputs of the feed-forward layer for the stabilizer qubits, wherein the outputs are arranged within the spatial grid according to positions of the corresponding stabilizer qubits within the quantum computer.

In some implementations, the self-attention layer comprises one or more self-attention heads, and each self-attention head generates an output for each stabilizer qubit, wherein generating an output for each stabilizer qubit comprises: obtaining an input to the self-attention layer, wherein the input comprises at least a respective embedding of the respective feature for each stabilizer qubit at the time step; mapping the embedding of the respective feature for each stabilizer qubit to queries, keys, and values of the head; computing initial attention logits that each represent a measure of dependency between stabilizer qubits using the queries and the keys, wherein each initial attention logit corresponds to a pair of stabilizer qubits; adding, to each initial attention logit, a respective attention bias to generate respective final attention logits; generating a respective attention weight from each final attention logit; and generating, for each stabilizer qubit, an output for the stabilizer qubit by computing a weighted sum of the values, wherein the values are weighted by the corresponding attention weights.

In some implementations, the method further comprises masking a subset of the final attention logits so that, for each stabilizer, only final attention logits for pairs of stabilizer qubits within a local neighborhood of the stabilizer qubit are non-zero.

In some implementations, for each initial attention logit, the respective attention bias is generated by applying a projection into an embedding characterizing the corresponding pair of stabilizer qubits for the initial attention logit.

In some implementations, the embedding characterizing the corresponding pair of stabilizer qubits characterizes a spatial distance between each stabilizer qubit in the pair of stabilizer qubits.

In some implementations, the embedding characterizing the corresponding pair of stabilizer qubits characterizes a similarity between a type of each stabilizer qubit in the pair of stabilizer qubits.

In some implementations, the embedding characterizing the pair of corresponding stabilizer qubits characterizes a temporal relationship between each stabilizer qubit in the pair of stabilizer qubits.

In some implementations, the embedding characterizing the pair of corresponding stabilizer qubits is shared among each self-attention head of each self-attention layer.

In some implementations, each self-attention head of each self-attention layer applies a different, learned projection to the shared embedding to generate the attention bias for the corresponding pair of stabilizer qubits.

In some implementations, the prediction of whether an error occurred in the computation comprises a respective prediction for each of a plurality of logical observables.

In some implementations, generating a prediction of whether an error occurred in the computation comprises: generating, from the decoder state for the last time step, a plurality of respective inputs to a plurality of prediction neural networks; and processing each respective input using the corresponding prediction neural network to generate a respective score that indicates whether an error for a particular logical observable occurred.

In some implementations, generating a prediction of whether an error occurred in the computation comprises: generating, from the decoder state for the last time step, a plurality of inputs to a prediction neural network, wherein each input is a transposed version of another input; and processing each input using the prediction neural network to generate a respective score that indicates whether an error for a particular logical observable occurred.

In some implementations, the method further comprises: initializing a second decoder state that represents information about the plurality of stabilizer qubits; and for each of the plurality of time steps: generating a second intermediate representation comprising, for each of the stabilizer qubits, a second respective embedding of the respective feature for the stabilizer qubit at the time step; and processing a second time step input through a second Transformer neural network to generate a second decoder state for the time step, wherein the second time step input comprises the second intermediate representation for the time step and the second decoder state for a preceding time step; and generating a second prediction of whether an error occurred in the computation from the second decoder state for the last time step of the plurality of time steps.

The subject matter described in this specification can be implemented in particular ways so as to realize one or more of the following advantages.

Conventional techniques for quantum error detection have limitations which might make them impractical to use. For instance, conventional decoders may be constrained by computational resources, meaning they may not reach the larger code sizes or throughput rates necessary for practical fault-tolerant quantum computation. Thus conventional decoders may be limited to smaller code sizes that are not large enough to perform error correction, or to throughput rates that are too slow for some cycle times of quantum hardware. Conventional decoders may also be limited to simple noise models that are not representative of noise in current hardware, limiting their error suppression capabilities. In addition, conventional decoders may be limited to decoding a small number of rounds of error correction data. Furthermore, some conventional decoders are limited to the toric code, which is not directly realizable in practice.

The techniques described in this specification allow for more accurate error detection. For example, conventional decoders process only stabilizer events, which represent temporal differences in stabilizer measurements. Conventional decoders may not consider some of the errors that are most detrimental to decoder performance, such as leakage and cross-talk. Some conventional decoders do not utilize rich side information, such as the full in-phase and quadrature (I/Q) readout signal from quantum measurements. The decoder can process features of different types, such as measurements such as I/Q measurements, leakage data, derived quantities such as detection events, and/or other parameters such as temperature. The decoder can thus learn from more sources of information. Having more sources of information can also make training faster and more stable.

The techniques described in this specification allow for fixed runtime. For example, the runtime of conventional decoders may depend on the noise level and running conventional decoders may become computationally more costly as the noise level increases and the number of events increases, as conventional decoders may perform processing proportional to the number of events. The runtime of the decoder is not noise-level dependent. For example, the decoder performs the same types of computation at each updating time step, regardless of whether there were any events for the updating time step. In addition, many operations of the neural network are parallelizable. For example, operations such as matrix multiplications and attention operations can be parallelized.

The techniques described in this specification allow for arbitrary experiment lengths. For example, the decoder runs through an iterative computation of multiple updating time steps, and the same computation block is applied for each updating time step. For each updating time step, the decoder applies a basic computation block that takes the representation of the current state of the qubits and stabilizer readouts for the current updating time step. Thus the decoder can be run for an arbitrary number of updating time steps, regardless of the number of updating time steps the decoder was trained on. The decoder can be used to decode computations with more updating time steps than the number of updating time steps the decoder was trained on. The decoder does not need to be trained for a specific number of updating time steps, increasing flexibility and decreasing training time and resources.

The techniques described in this specification can allow for efficient computation by stopping error-prone computations early, or by repeating or replicating error-prone computations. For example, conventional decoders may output a thresholded classification. The decoder described in this specification can predict probabilities of errors that can be used as a confidence measure. For example, the probabilities can be used in fault-tolerant protocols such as magic state distillation. As another example, the probabilities can be used as a confidence measure for postselection. The postselection techniques can reduce overhead and short-circuit expensive computations because they can provide an early and probabilistic indication of failure. In addition, while a confidence measure can be approximated using conventional techniques, approximating the confidence measure may be computationally expensive and less accurate. The decoder described in this specification can provide for fault-tolerant protocols without runtime penalty.

The techniques described in this specification describe a decoder model that can be used to perform error detection over larger code sizes.

For example, the decoder can be trained and evaluated on simulated data. The simulated data can correspond to different, larger code sizes. The decoder can learn the correlation between errors in different stabilizers from the spatial layout of the qubits. The decoder can also be trained on raw data from real hardware. The performance of the decoder is thus not dependent on the availability or accuracy of a noise model and reduces the reliance on the ability to obtain an accurate noise profile of the quantum device, which can be difficult.

The techniques described in this specification can reduce the computing time and resources required to train a model to work on different hardware architectures. For example, the decoder can be pre-trained on a generic noise model. The decoder can be specialized to perform error detection for different quantum computing chips by fine-tuning on small quantities of experimental data for the different quantum computing chips. For example, quantum computing chips can vary greatly and over time. The decoder can be fine-tuned on experimental data for each different quantum computing chip, and further fine-tuned for each different quantum computing chip at intervals of time.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a diagram of an example embedding engine for generating an intermediate representation for each updating time step.

FIG. 8 is a diagram of an example Transformer layer.

FIG. 9 is a flow diagram of an example process for generating an output for each stabilizer qubit.

Like reference numbers and designations in the various drawings indicate like elements.

DETAILED DESCRIPTION

Figure 1:
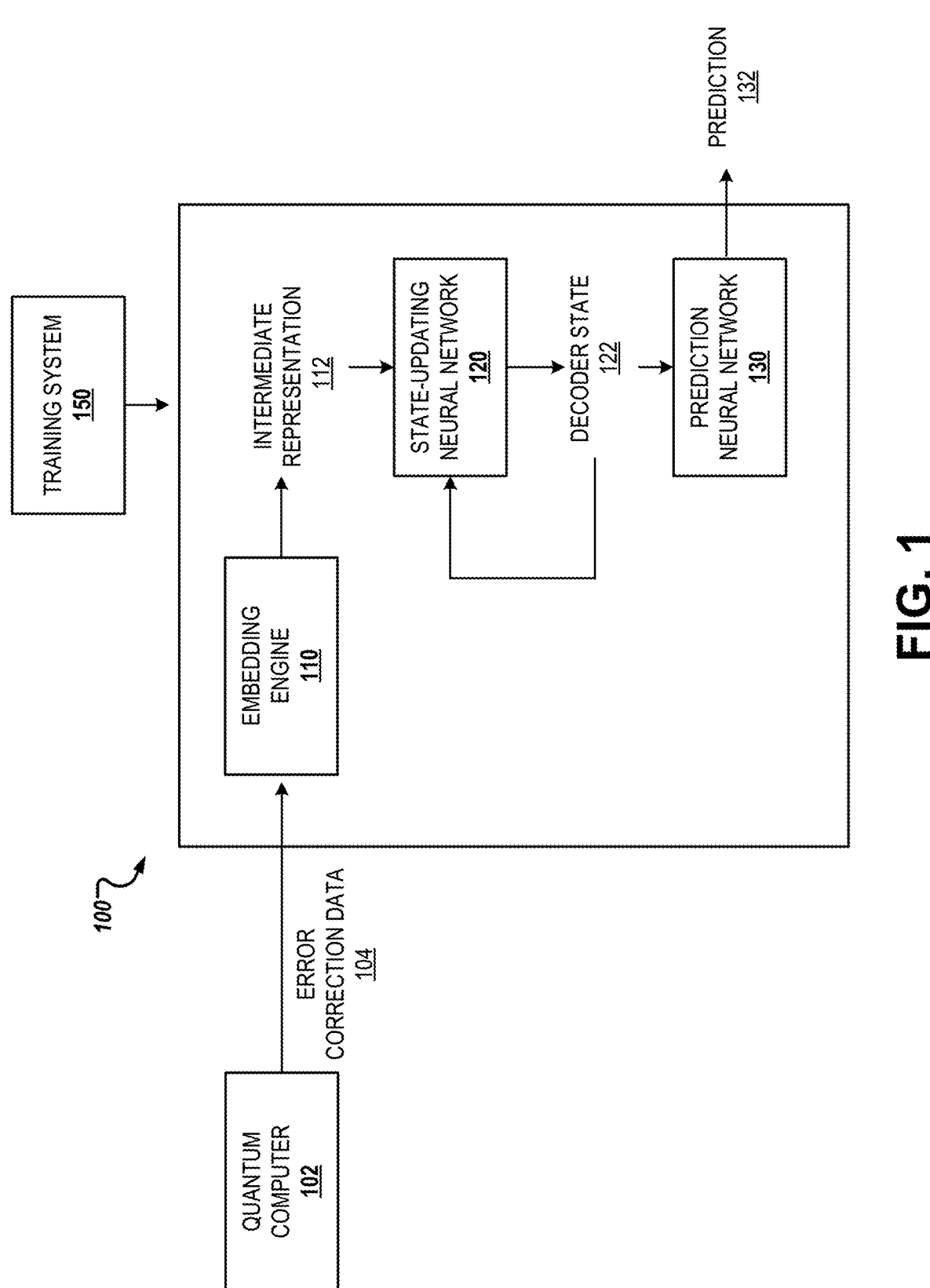
FIG. 1 is a block diagram of an example system for detecting errors in a computation performed by a quantum computer.

FIG. 1 is a block diagram of an example system 100 for detecting errors in a computation performed by a quantum computer. The system 100 is an example of a system implemented as computer programs on one or more computers in one or more locations in which the systems, components, and techniques described below are implemented. The system 100 includes an embedding engine 110, a state-updating neural network 120, and a prediction neural network 130.

The system 100 generates a prediction of whether an error occurred in a computation performed by a quantum computer 102.

The quantum computer 102 maintains sequences of quantum bits, called qubits, where each quantum bit can represent a zero, one, or any quantum superposition of zeros and ones. The quantum computer 102 operates by setting qubits in an initial state and controlling the qubits. The quantum computer 102 can implement quantum circuits that can perform computations.

Figure 2:
FIG. 2 shows an example surface code layout.

For example, FIG. 2 shows an example surface code layout 200. The surface code layout 200 includes data qubits 210 and stabilizer qubits 220. The data qubits 210 are represented as circular dots in FIG. 2. Representative data qubits 210*a*, 210*b*, 210*c*, and 210*d* are labeled in FIG. 2. The stabilizer qubits 220 are represented as circular dots labeled with "X" or "Z" in FIG. 2. Representative stabilizer qubits 220*a*, 220*b*, 220*c*, 220*d*, 220*e*, 220*f*, 220*g*, 220*h*, 220*i*, and 220*j* are labeled in FIG. 2.

In the surface code, a logical qubit is formed by a d×d grid of data qubits, such that errors can be detected by periodically measuring X and Z stabilizer checks on groups of adjacent data qubits, using $d^2-1$ stabilizer qubits located between the data qubits. The data qubits 210 are arranged in a grid and the "X" and "Z" stabilizer qubits 220 are arranged in a checkerboard pattern in between the data qubits 210.

Thus, each stabilizer qubit 220 can correspond to a subset of the data qubits 210. Each stabilizer qubit 220 is associated with a position within the grid. The subset of the data qubits 210 that a particular stabilizer qubit 220 corresponds to can be the adjacent data qubits to the position of the particular stabilizer qubit 220. For example, the "Z" stabilizer qubit 220*d* can correspond to data qubits 210*a*, 210*b*, 210*c*, and 210*d*. The stabilizer 220*d* can make stabilizer measurements for the data qubits 210*a*, 210*b*, 210*c*, and 210*d*. For example, the stabilizer 220*d* can perform parity measurements for the data qubits 210*a*, 220*b*, 210*c*, and 210*d*. In some implementations, a stabilizer qubit 220 can correspond to different subsets of the data qubits 210 at different times.

A system such as the system 100 of FIG. 1 can determine an error status of the logical qubit represented by the layout 200 by looking at a logical observable, represented as a line across the grid. Example logical observables $X_L$ 240 and $Z_L$ 230 are shown as bold lines on the left and bottom grid edges. The logical observables 240 and 230 commute with the stabilizers but anti-commute with each other. The logical observables 240 and 230 can define the logical state of the logical qubit. The minimum length of the logical observable is the code distance and represents the number of errors required to erroneously transform the logical state. For a square surface code, the minimum length is equal to the side length d of the grid. For example, the minimum length, and thus the code distance, in FIG. 2 is five. The logical observable $X_L$ can correspond to the X-basis, which corresponds to a bitflip error. The logical observable $Z_L$ can correspond to the Z-basis, which corresponds to a phaseflip error. The system can determine the error status for one basis by making a prediction for a corresponding logical observable for the basis. For example, the system can make five separate predictions in FIG. 2, one for each of the five horizontal lines. In some implementations, the system can make predictions for each of the five vertical lines. In some implementations, the system can make one prediction. For example, the system can make a prediction for the first horizontal line, or the first vertical line. In some implementations, the system can make a prediction for both bases by making predictions for lines that are perpendicular to each other. For a given layout, the horizontal lines may correspond to an error in the X-basis, and the vertical lines may correspond to an error in the Z-basis as is shown in example layout 200. In some examples, for a given layout, the horizontal lines may correspond to an error in the Z-basis, and the vertical lines may correspond to an error in the X-basis.

Referring to FIG. 1, the system 100 can use the history of stabilizer features to predict whether to apply a correction to the noisy logical measurement outcome to obtain the correct outcome.

To generate a prediction, the system 100 obtains error correction data for each time step during a computation. The error correction data for each time step can include one or more respective features for each stabilizer qubit. Each stabilizer qubit corresponds to a subset of the data qubits for the time step.

The system 100 also initializes a decoder state 122. The decoder state 122 can include representations of any type of qubit within the quantum computer. For example, for each updating time step other than the first updating time step, a representation can store information about the qubits up to the current updating time step. The decoder state 122 can include, for example, representations of data qubits, representations of stabilizer qubits, and representations of both data qubits and stabilizer qubits. Each updating time step can correspond to one or more time steps. For example, in some implementations, each updating time step can correspond to one time step.

For each updating time step, the system 100 uses an embedding engine 110 to generate an intermediate representation 112 for each of the stabilizer qubits. The intermediate representation 112 can include one or more embeddings representing the respective features for the stabilizer qubit at the one or more time steps corresponding to the updating time step.

For each updating time step, the system 100 uses a state-updating neural network 120 to update the decoder state 122 for the updating time step. The system 100 updates the decoder state 122 for each updating time step by incorporating the stabilizer features from the one or more time steps that correspond to the updating time step. For example, the state-updating neural network 120 processes a time step input that includes the intermediate representation 112 for the updating time step and the decoder state 122 from a preceding updating time step.

The system can generate the time step input by combining, e.g., adding or concatenating, the intermediate representation 112 to the decoder state 122. For example, the decoder state 122 can include a vector representation for each stabilizer qubit that represents the current state of the stabilizer qubit as of the updating time step.

The state-updating neural network 120 updates the decoder state 122 by passing information between stabilizer representations in a learned manner. For example, the state-updating neural network can be a Transformer neural network that passes information through self-attention. Some examples of a Transformer neural network are described below with reference to FIGS. 7-8. In some implementations, the state-updating neural network 120 can be a graph network, a recurrent neural network (RNN), a convolutional neural network (CNN), a multilayer perceptron (MLP), an MLP-Mixer, or a long short-term memory network (LSTM).

For the last updating time step, the system 100 can use a prediction neural network 130 to generate a prediction of whether an error occurred in the computation from the decoder state 122 for the last updating time step. The prediction neural network 130 can include multiple components and a prediction head, for example. An example prediction neural network 130 is described in more detail below with reference to FIG. 10. In some implementations where each updating time step corresponds to more than one time step, the system can generate an input to the prediction neural network 130 from the decoder state from the last time step of the time steps that correspond to the last updating time step. In other implementations, the last updating time step can correspond only to the last time step of the time steps, and the system can generate an input to the prediction neural network 130 from the decoder state of the last updating time step.

The system 100 can be trained by a training system 150, for example. The training system 150 can obtain training samples from simulated data. Since the quantity of experimental data is limited, the training system 150 can use a detector error model (DEM), a noise model fitted to experimental data, from which to draw unlimited samples for pre-training the system 100 with a distribution approximating the true experimental data. When the system 100 is fully pre-trained, the training system 150 can further train the system 100 using the limited amount of experimental data. In some implementations, the training system 150 can use weight decay relative to the pre-trained system to regularize the system 100. Because the pre-trained system is fine-tuned using experimental data, the system 100 can have high performance even without access to a carefully tuned noise model. Quantum computing chips can vary greatly and over time. In some implementations, the system 100 can be fine-tuned on experimental data for each different quantum computing chip. In some implementations, the system 100 can be fine-tuned for each different quantum computing chip at intervals of time.

The DEM can be represented as an error hypergraph, where stochastic error mechanisms are hyperedges connecting the clusters of detectors, or stabilizer qubits, they trigger. The mechanisms are independent and have an associated error probability. In some implementations, the training system 150 can use other noise models such as a data qubit depolarizing noise model, or a circuit depolarizing noise model.

In some implementations, the training system 150 can generate the simulated data with noiseless measurements. The training system 150 can add noise to the simulated data by using discrete assignment error (flipping each measurement outcome with a certain probability) or by emulating raw in-phase and quadrature signals. For example, the training system 150 can use probability density functions centered around different possible states such as $|0\rangle$, $|1\rangle$, and $|2\rangle$. The probability distributions can be parameterized by a signal-to-noise ratio and a dimensionless measurement duration, the ratio of the measurement duration to the qubit lifetime. The distribution for $|0\rangle$ can be a Gaussian distribution centered at 0. The distribution for $|1\rangle$ can be centered at 1, with the effect of decay from $|1\rangle$ to $|0\rangle$. The distribution for $|2\rangle$ can be centered at 2, with the decay from $|2\rangle$ to $|1\rangle$ occurring about twice as frequently as $|1\rangle$ to $|0\rangle$. For each measurement outcome from the simulation of a state, the training system 150 can sample a value according to the probability density functions. The value can be processed using a prior probability distribution and known probability density functions to determine a posterior probability for each state. Inputs derived from the value can include the posterior probability of observing a $|1\rangle$ state, conditioned that the state was not leaked, and the probability of leakage.

In some implementations, the training system 150 can train the system 100 differently for the last updating time step. For example, the training system 150 can train the system 100 to include a separate embedding for the final time step. In these implementations, the error correction data for the last updating time step can include stabilizer features derived from measuring one basis of the data qubits. Measuring the data qubits can correspond to performing a logical measurement of the qubit. In some implementations, for the final time step, the system 100 can learn a separate final embedding for undefined off-basis stabilizers and a separate linear projection for on-basis computed stabilizers.

In some implementations, the training system 150 can use a noise curriculum. The noise curriculum can include training samples with lower noise levels at the beginning of the training process, and continuously transition to higher noise levels during the training process. For example, higher noise levels can have a higher error event probability.

In some implementations, the training system 150 can train the system 100 to make predictions for multiple code distances. For example, as described with reference to FIG. 2, the code distance d is the side length of the grid. A grid with a larger code distance includes a larger number of data qubits and stabilizer qubits than a grid with a smaller code distance. Thus, the decoder state 122 can include different numbers of vector representations for different code distances. That is, depending on the code distance, the decoder state 122 can have a different dimensionality. The training system 150 can train the system 100 to make predictions for multiple code distances by training the model sequentially with increasing code distances over the training process. For example, the model can be trained at code distances of 3, 5, 7, . . . 17, etc. Pre-training the model on smaller code distances can improve the training of the model on larger code distances. Thus the training system 150 can train the model sequentially to reduce the computing time and resources that would have been required to train the model directly on larger code distances.

In some implementations, the training system 150 can train the model with a curriculum of code distances. For example, the model can be trained at a mix of code distances. For example, to train the model for a code distance of 17 more quickly, the training system 150 can train the model partway for a code distance of 7, then train the model partway for a code distance of 17, then train the model more completely for a code distance of 17, and then train the model partway for a code distance of 7, 9, 11, 13, and 15.

The training system 150 can train the system 100 using cross-entropy objectives with binary targets. In some implementations, the system 100 can be trained to make a prediction for each of the rows or columns corresponding to the equivalent choices of logical observables in the experiment basis. In these implementations, the training system 150 can average the loss for each prediction. The training system 150 can thus train more quickly with more targets.

In some implementations, the training system can use next stabilizer prediction cross-entropy loss averaged across all updating time steps and all stabilizers, and then downweighted relative to the error prediction loss.

The training system 150 can minimize the loss using stochastic gradient descent. The training system 150 can also use weight decay. In some implementations, the training system 150 can use a piecewise constant learning rate. The training system 150 can use a batch schedule that increases the batch size over the training process. The training system 150 can also perform hyperparameter tuning for the state-updating neural network.

In some implementations, such as implementations where each updating time step corresponds to one time step, the system 100 can be trained to predict the stabilizer features for a following time step. Generating a prediction for the stabilizer features for a following time step also results in a larger number of labels to improve the training process. For example, the system can use a linear projection and logistic output unit to process each stabilizer's representation to make a prediction of the next time step's stabilizer features.

In some implementations, the system 100 can use the predicted stabilizer features for a following time step to dynamically adjust the code. For example, the result for a particular stabilizer at the following time step may indicate a high confidence that the feature will not change. The system can determine to not perform a stabilizer operation to obtain a feature for the particular stabilizer at the following time step, for example.

Figure 3:
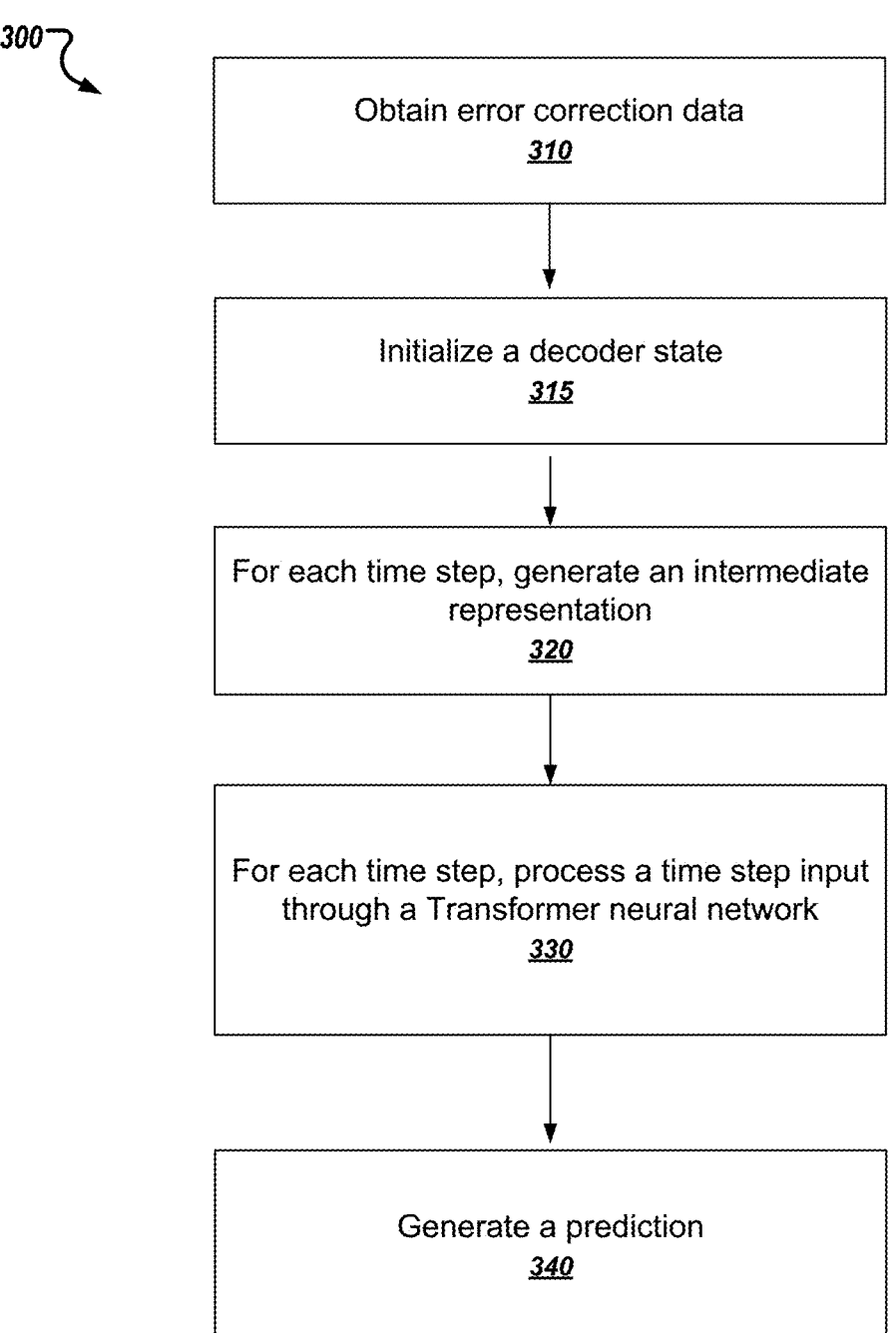
FIG. 3 is a flow diagram of an example process for detecting errors in a computation performed by a quantum computer that includes multiple data qubits.

FIG. 3 is a flow diagram of an example process 300 for detecting errors in a computation performed by a quantum computer that includes multiple data qubits. For convenience, the process 300 will be described as being performed by a system of one or more computers located in one or more locations. For example, the system 100 of FIG. 1, appropriately programmed in accordance with this specification, can perform the process 300.

The system obtains error correction data (step 310). The error correction data can include a respective feature for each of multiple stabilizer qubits for each of multiple time steps during the computation. Each stabilizer qubit can correspond to a respective subset of the data qubits for the time step. In some implementations, each stabilizer qubit can correspond to the same respective subset of the data qubits at each time step. In some implementations, one or more of the stabilizer qubits can correspond to a different respective subset of the data qubits at different time steps. In some implementations, the system can obtain error correction data for multiple time steps during the computation. For example, the system can obtain error correction data for all of the time steps during the computation at once. In some implementations, the system can obtain error correction data at each time step. In some implementations, the system can obtain error correction data for each of multiple updating time steps at a time. Each updating time step can correspond to one or more time steps. An example process for detecting errors in a computation with updating time steps is discussed in further detail below with reference to FIG. 4.

In some implementations, the feature for each of the stabilizer qubits can include an analog measurement of the corresponding subset of data qubits at the time step.

In some implementations, the feature for each of the stabilizer qubits can include leakage data characterizing leakage of the corresponding subset of data qubits at the time step.

In some implementations, the feature for each of the stabilizer qubits can include posterior probabilities of a stabilizer measurement given analog measurements of the corresponding subset of data qubits.

In some implementations, the feature for each of the stabilizer qubits can include a time series of analog measurements of the corresponding subset of data qubits for a period of time ending at the time step.

In some implementations, the error correction data for each time step can include stabilizer events for one or more of the stabilizer qubits at the time step.

In some implementations, at the last time step, the error correction data can include derived stabilizer features. For example, the system can obtain measurements of data qubits at the last time step. The system can derive stabilizer features for each stabilizer qubit from the measurements of corresponding data qubits.

The types of features are described in further detail below with reference to FIG. 6.

The system can initialize a decoder state that represents information about the stabilizer qubits (step 315). The decoder state can be a representation of the stabilizer qubits observed through a current time step. For example, the decoder state can include a vector for each stabilizer qubit. The decoder state can be initialized to a vector of zeros for each stabilizer qubit. In some implementations, the decoder state can include a representation of the data qubits. In some implementations, the decoder state can include a representation of the stabilizer qubits and the data qubits.

The system can perform step 320 and 330 for each of multiple time steps. In some implementations, the system can obtain data representing stabilizer measurements as described above in step 310 at each time step prior to performing steps 320 and 330 for the time step.

The system can generate an intermediate representation (step 320). For each stabilizer qubit, the intermediate representation can include an embedding of the feature for the stabilizer qubit at the time step. In some implementations, the intermediate representation can include a respective embedding for each of multiple features for the stabilizer qubit at the time step. In some implementations, the intermediate representation can include a respective embedding for the error correction data for the time step. The system can obtain a positional embedding for each stabilizer qubit characterizing a position of the stabilizer qubit within the quantum computer. In some implementations, the positional embedding for each stabilizer qubit can characterize a position of the data qubit that the stabilizer qubit corresponds to. For example, the positional embedding can be a learned input embedding of a stabilizer index for each stabilizer. The system can process the embeddings of the stabilizer features and the positional embeddings for the stabilizer qubit using an encoding neural network to generate the intermediate representation for the updating time step. Generating an intermediate representation is described in further detail below with reference to FIG. 6.

In some implementations where the error correction data includes derived stabilizer features at the last time step, the system can use a separate embedding for the last time step. For example, the system can use a separate final embedding for undefined off-basis stabilizer qubits and a separate linear projection for on-basis computed stabilizer qubits.

The system can process a time step input through a Transformer neural network (step 330) to update the decoder state for the time step. The time step input can include the intermediate representation for the time step and the decoder state for a preceding time step.

The Transformer neural network can include one or more Transformer layers, and each Transformer layer can include a self-attention layer and a feed-forward layer. Each Transformer layer can also include one or more convolutional layers that apply convolutions over a spatial grid of outputs of the feed-forward layer for the stabilizer qubits. The outputs are arranged within the spatial grid according to positions of the corresponding stabilizer qubits within the quantum computer. An example Transformer neural network is described in further detail below with reference to FIG. 7. An example Transformer layer is described in further detail below with reference to FIG. 8.

The self-attention layer can include one or more heads, and each head can generate an output for each stabilizer qubit. An example process for generating an output for each stabilizer qubit is described in more detail below with reference to FIG. 9.

The system can generate a prediction (340). The prediction can represent whether an error occurred in the computation from the decoder state for the last time step of the multiple time steps.

The system can generate a prediction using a prediction neural network as described in more detail below with reference to FIG. 10. For example, the system can generate a prediction by generating, from the decoder state for the last time step, an input to a prediction neural network. The system can process the input using the prediction neural network to generate a score that indicates whether an error occurred. In some implementations, the score can be a probability that an error occurred. In some implementations, the system can process the score to generate a 0 or 1 output of whether an error occurred in the computation.

In some examples, the prediction of whether an error occurred in the computation includes a prediction for each of multiple logical observables. For example, the prediction neural network may generate a prediction for one line in the grid of data qubits. The line in the grid of data qubits may correspond to an error in the X-basis, or an error in the Z-basis.

In some implementations, the prediction neural network can receive an input that includes a final embedding for undefined off-basis stabilizers and a linear projection for on-basis computed stabilizers. In these implementations, the prediction neural network can receive an input that indicates the basis that the stabilizer measurements for the last time step correspond to. For example, the input can include an embedding for the X-basis or the Z-basis.

In some implementations, to generate a prediction in both bases, the system can generate multiple inputs to multiple prediction neural networks from the decoder state at the last time step. For example, the system can include multiple prediction neural networks. The system can generate an input to each prediction neural network. The system can process each input using the corresponding prediction neural network to generate a score that indicates whether an error for a particular logical observable occurred. For example, the system can include an X-basis prediction neural network and a Z-basis prediction neural network. The system can generate an X-basis input to the X-basis prediction neural network and a Z-basis input to the Z-basis prediction neural network. The system can provide the X-basis input to the X-basis prediction neural network to generate a prediction for the X-basis. The system can provide the Z-basis input to the Z-basis prediction neural network to generate a prediction for the Z-basis.

In some implementations, to generate a prediction in both bases, the system can generate multiple inputs to the same prediction neural network from the decoder state for the last time step. For example, the system can generate two inputs, where each of the two inputs are transposed versions of each other input. The system can process each input using the prediction neural network to generate a score that indicates whether an error for a particular logical observable occurred.

For example, the prediction neural network can be trained to make predictions over horizontal lines. The system can generate an input for the X-basis, for example, that runs horizontally. The system can generate an input for the Z-basis that is a transposed version of the input for the X-basis so that the vertical lines are now horizontal lines. The system can use the prediction neural network to generate a score for the input for the X-basis. The system can also use the prediction neural network to generate a score for the input for the Z-basis. The prediction neural network still makes predictions for horizontal lines, but the horizontal lines in the input for the Z-basis now correspond to what were vertical lines in the decoder state representation.

In some implementations where the system can generate multiple inputs to the same prediction neural network, the system can include a learned basis embedding vector in the input to the prediction neural network. For example, the learned basis embedding vector can indicate that the input is for the X-basis, or the input is for the Z-basis.

In some implementations, to generate a prediction for both bases, the system can include a model for each basis. Each model can include an embedding engine, a state-updating neural network, and/or a prediction neural network that has been trained for the model. For example, the system can include an X-basis model and a Z-basis model. The system can thus have two processes running at the same time to make predictions for both bases. That is, the system can initialize a second decoder state that represents information about the multiple stabilizer qubits. For each time step, the system can generate a second intermediate representation that includes, for each of the stabilizer qubits, a second respective embedding of the respective feature for the stabilizer qubit at the time step. For each time step, the system can process a second time step input through a second state-updating neural network to generate a second decoder state for the time step. The second time step input can include the second intermediate representation for the time step and the second decoder state for a preceding time step. The system can then generate a second prediction of whether an error occurred in the computation from the second decoder state for the last time step of the plurality of time steps.

In some implementations, the system can perform ensembling with multiple models for better performance. For example, the model of system 100, e.g., that includes the embedding engine 110, state-updating neural network 120, and prediction neural network 130, can be one of an ensemble of models that each generate a respective prediction. Each model can include an embedding engine, a state-updating neural network, and/or a prediction neural network that has been trained for the model. Each model can generate a separate prediction for the same stabilizer measurements. The system can combine predictions from multiple models to obtain a more accurate prediction. For example, the system can generate a final prediction from each of the respective predictions from each of the models in the ensemble of models. Since the models can be run independently in parallel, ensembling does not change the computation speed. For example, multiple models can be trained with identical hyperparameters, but with different random seeds leading to different parameter initializations and training on different sequences of examples. For example, each model can output a log-probability. The system can apply a logistic function to each log-probability to obtain a predicted error probability. The system can then compute a geometric mean of the predicted error probabilities. In some implementations, the system can average probabilities or use a learned model to combine the outputs of the multiple models.

In some implementations, the system can perform post-selection. For example, the system can be trained with a logistic output, minimizing cross-entropy against binary labels. Thus, the output can be interpreted as the probability that the true label is $|1\rangle$. For example, of experiments with prediction probability 0.8, approximately 80% will have the true label $|1\rangle$. The system can use the probabilistic output as a confidence measure to discard the least confident computations. The system can also obtain the probabilistic output without runtime overhead. The system can provide for the ability to shortcut routines with multiple computations to improve the accuracy of routines that include a sequence of multiple computations. For example, the system can make a prediction for a particular computation in the routine. If the prediction indicates a probability with high confidence of there being an error, the system can restart the routine at the first computation in the sequence of computations in the routine. For example, for each computation in the routine, the system can determine if the prediction includes a probabilistic output over a threshold probabilistic output. If the system determines that the probabilistic output satisfies the threshold probabilistic output, the system can restart the routine at the first computation in the sequence of computations in the routine. The system can thus short-circuit expensive routines early on given an indication of failure, leading to a shorter overall computation time. The calibrated error probability can accelerate subroutines such as magic state distillation, which in turn is an essential ingredient to implement transversal gates in stabilizer codes such as the surface code, by providing an early probabilistic indication of failure.

In some implementations, the system can perform the same computation on multiple grids of data qubits in parallel and choose to proceed with the routine using one of the grids. The system can include a model for each grid of data qubits. The system can obtain error correction data for each time step for each grid of data qubits and process the error correction data for each updating time step using the model corresponding to each grid of data qubits. Each model can generate a prediction of whether an error occurred in the computation for the corresponding grid of data qubits. In these implementations, the prediction is a probabilistic output that the system can use as a confidence measure. The system can thus identify a prediction with the highest confidence. For example, the system can identify the prediction with the highest confidence that the true label is $|1\rangle$. The system can perform any following computations in the sequence of computations using the grid of data qubits that corresponds to the identified prediction.

In some implementations, the system can perform the same computation on multiple grids of data qubits in parallel and choose to proceed with downstream tasks using one of the grids. The system can include a model for each grid of data qubits. The system can obtain error correction data for each time step for each grid of data qubits and process the error correction data for each updating time step using the model corresponding to each grid of data qubits. Each model can generate a prediction of whether an error occurred in the computation for the corresponding grid of data qubits. In these implementations, the prediction is a probabilistic output that the system can use as a confidence measure. The system can thus identify a prediction with the highest confidence. For example, the system can identify the prediction with the highest confidence that the true label is $|1\rangle$.

The system can thus use the grid corresponding to the identified prediction to perform downstream tasks for the computation.

The performance of the quantum computer may depend on the decoding time. In some implementations, the system can use techniques to speed up the decoding time. For example, the state-updating neural network can be tuned to a particular code distance to remove or scale back slower parts of the network with little or no effect on error suppression. For instance, the system can change the number of channels or layers in certain parts of the model. For example, the system can reduce the number of layers of the prediction neural network, embedding engine, or state-updating neural network. The system can also exclude some input features. The system can also exclude other parts of the network such as attention bias or convolutional operations. In some implementations, the system does not perform pooling operations, or performs pooling operations across all stabilizer qubits rather than along data qubit rows or columns. The system can evaluate the performance of modified versions of the decoder that each have different parts removed or scaled back. The system can determine to use a modified version of the decoder with some parts removed or scaled back if the performance of the modified version of the decoder does not drop below a threshold relative to the performance of the original decoder.

As another example, the system can use distillation, lower precision inference, and weight pruning to reduce computation time. For example, the system can change the hyper-parameters, e.g., use a smaller network with fewer layers or channels. In some implementations, the system can use a different architecture.

The system can also run on a specific hardware implementation, for example with custom hardware such as ASICs or FPGAs. For example, the specific hardware implementation can allow for higher computation speed. As another example, the specific hardware implementation can provide for a high degree of parallelism and pipelining. In addition, the specific hardware implementation can be specialized to perform fixed-point arithmetic to reduce the complexity of addition and multiplication operations.

In addition, the system can leverage parallel processing to decrease the decoding time. For example, many operations of the neural network can be carried out in parallel. As an example, attention operations that include the dot product of keys and queries can be performed in parallel. In addition, matrix multiplication can be parallelized. Some processes such as the embedding of the stabilizer qubits can be pipelined to decrease latency. For example, the system can process a first embedding layer for a second time step while processing the second embedding layer for a first time step.

Figure 4:
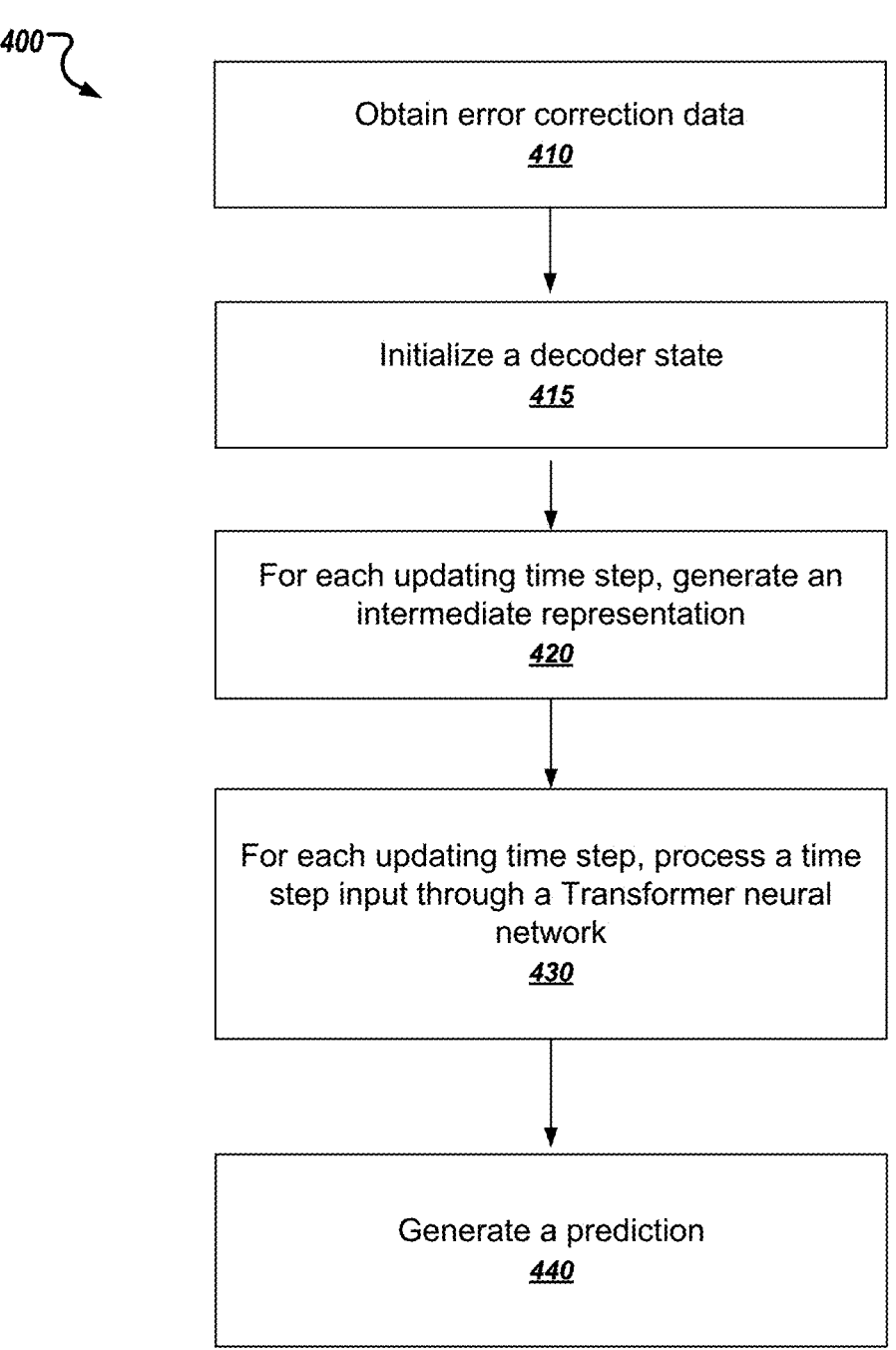
FIG. 4 is a flow diagram of another example process for detecting errors in a computation performed by a quantum computer that includes multiple data qubits.

FIG. 4 is a flow diagram of another example process 400 for detecting errors in a computation performed by a quantum computer that includes multiple data qubits. For convenience, the process 400 will be described as being performed by a system of one or more computers located in one or more locations. For example, the system 100 of FIG. 1, appropriately programmed in accordance with this specification, can perform the process 400.

The system obtains error correction data (step 410). The error correction data can include a respective feature for each of multiple stabilizer qubits for each of multiple time steps during the computation. Each stabilizer qubit can correspond to a respective subset of the data qubits for the time step. In some implementations, each stabilizer qubit can correspond to the same respective subset of the data qubits at each time step. In some implementations, one or more of the stabilizer qubits can correspond to a different respective subset of the data qubits at different time steps. In some implementations, the system can obtain error correction data for multiple time steps during the computation. For example, the system can obtain error correction data for all of the time steps during the computation at once. In some implementations, the system can obtain error correction data at each updating time step. That is, the system can obtain error correction data for each of multiple time steps corresponding to the updating time step at the updating time step.

In some implementations, the feature for each of the stabilizer qubits can include an analog measurement of the corresponding subset of data qubits at the time step.

In some implementations, the feature for each of the stabilizer qubits can include leakage data characterizing leakage of the corresponding subset of data qubits at the time step.

In some implementations, the feature for each of the stabilizer qubits can include posterior probabilities of a stabilizer measurement given analog measurements of the corresponding subset of data qubits.

In some implementations, the feature for each of the stabilizer qubits can include a time series of analog measurements of the corresponding subset of data qubits for a period of time ending at the time step.

In some implementations, the error correction data for each time step can include stabilizer events for one or more of the stabilizer qubits at the time step.

In some implementations, at the last time step, the error correction data can include derived stabilizer features. For example, the system can obtain measurements of data qubits. The system can derive stabilizer features for each stabilizer qubit from the measurements of corresponding data qubits.

The types of features are described in further detail below with reference to FIG. 6.

The system can initialize a decoder state that represents information about the stabilizer qubits (step 415). The decoder state can be a representation of the stabilizer qubits observed through a current updating time step. For example, the decoder state can include a vector for each stabilizer qubit. The decoder state can be initialized to a vector of zeros for each stabilizer qubit. In some implementations, the decoder state can include a representation of the data qubits. In some implementations, the decoder state can include a representation of the stabilizer qubits and the data qubits.

The system can perform step 420 and 430 for each of multiple updating time steps. In some implementations, the system can obtain error correction data as described above in step 410 at each updating time step prior to performing steps 420 and 430 for the updating time step. Each updating time step can correspond to one or more time steps. For example, in some implementations, an updating time step can correspond to one time step. In some implementations, an updating time step can correspond to more than one time step. In some implementations, different updating time steps can correspond to different numbers of time steps.

The system can generate an intermediate representation (step 420). For each stabilizer qubit, the intermediate representation can include one or more embeddings of the respective feature for the stabilizer qubit at the one or more time steps corresponding to the updating time step. In some implementations, the intermediate representation can include a respective embedding for each of multiple features for the stabilizer qubit at the time step. In some implementations, the intermediate representation can include a respective embedding for the error correction data for the time step.

In some implementations, the system can generate respective embeddings for the stabilizer qubits for the updating time step. That is, the system can generate an embedding for each stabilizer qubit that represents the respective feature for all of the time steps that correspond to the updating time step. For example, the system can generate an embedding for each stabilizer qubit for each feature included in the error correction data for each updating time step.

In some implementations, the system can generate respective embeddings for the stabilizer qubits for each time step corresponding to the updating time step. That is, the system can generate respective embeddings for each stabilizer qubit that represent the respective feature for each time step corresponding to the updating time step. For example, the system can generate an embedding for each stabilizer qubit for each feature included in the error correction data for each time step in the updating time step.

The system can obtain a positional embedding for each stabilizer qubit characterizing a position of the stabilizer qubit within the quantum computer. In some implementations, the positional embedding for each stabilizer qubit can characterize a position of the data qubit that the stabilizer qubit corresponds to. For example, the positional embedding can be a learned input embedding of a stabilizer index for each stabilizer. The system can process the embeddings of the stabilizer features and the positional embeddings for the stabilizer qubit using an encoding neural network to generate the intermediate representation for the updating time step. Generating an intermediate representation is described in further detail below with reference to FIG. 6.

In some implementations where the error correction data includes derived stabilizer features at the last time step, the system can use a separate embedding for the last time step. For example, the system can use a separate final embedding for undefined off-basis stabilizer qubits and a separate linear projection for on-basis computed stabilizer qubits.

The system can process a time step input through a Transformer neural network (step 430) to update the decoder state for the updating time step. The time step input can include the intermediate representation for the updating time step and the decoder state for a preceding updating time step.

The Transformer neural network can include one or more Transformer layers, and each Transformer layer can include a self-attention layer and a feed-forward layer. Each Transformer layer can also include one or more convolutional layers that apply convolutions over a spatial grid of outputs of the feed-forward layer for the stabilizer qubits. The outputs are arranged within the spatial grid according to positions of the corresponding stabilizer qubits within the quantum computer. An example Transformer neural network is described in further detail below with reference to FIG. 7. An example Transformer layer is described in further detail below with reference to FIG. 8.

The self-attention layer can include one or more heads, and each head can generate an output for each stabilizer qubit. An example process for generating an output for each stabilizer qubit is described in more detail below with reference to FIG. 9.

The system can generate a prediction (440). The prediction can represent whether an error occurred in the computation from the decoder state for the last updating time step of the multiple updating time steps.

The system can generate a prediction using a prediction neural network as described in more detail below with reference to FIG. 10. For example, the system can generate a prediction by generating, from the decoder state for the last time step of the one or more time steps corresponding to the last updating time step, an input to a prediction neural network. In some implementations, one or more initial updating time steps correspond to respective one or more time steps, and the last updating time step corresponds only to a last time step of the multiple time steps. That is, the last updating time step includes one time step that is the last time step of the multiple time steps. The system can then generate, from the decoder state for the last updating time step, an input to a prediction neural network.

In some implementations, the system can generate an input to the prediction neural network from the decoder state for the last time step of the one or more time steps corresponding to any updating time step. In some implementations, the system can perform causal masking to generate an input to the prediction neural network from the decoder state for one or more time steps corresponding to any updating time step.

The system can process the input using the prediction neural network to generate a score that indicates whether an error occurred. In some implementations, the score can be a probability that an error occurred. In some implementations, the system can process the score to generate a 0 or 1 output of whether an error occurred in the computation.

In some examples, the prediction of whether an error occurred in the computation includes a prediction for each of multiple error types. For example, the prediction neural network may generate a prediction for one line in the grid of data qubits. The line in the grid of data qubits may correspond to an error in the X-basis, or an error in the Z-basis.

In some implementations, the prediction neural network can receive an input that includes a final embedding for undefined off-basis stabilizers and a linear projection for on-basis computed stabilizers. In these implementations, the prediction neural network can receive an input that indicates the basis that the stabilizer measurements for the last time step correspond to. For example, the input can include an embedding for the X-basis or the Z-basis.

In some implementations, to generate a prediction in both bases, the system can generate multiple inputs to multiple prediction neural networks from the decoder state at the last updating time step. In some implementations, the last updating time step can include one time step that is the last time step of the multiple time steps. In some implementations, the last updating time step can include multiple time steps that include the last time step of the multiple time steps.

For example, the system can include multiple prediction neural networks. The system can generate an input to each prediction neural network. The system can process each input using the corresponding prediction neural network to generate a score that indicates whether an error of a particular type occurred. For example, the system can include an X-basis prediction neural network and a Z-basis prediction neural network. The system can generate an X-basis input to the X-basis prediction neural network and a Z-basis input to the Z-basis prediction neural network. The system can provide the X-basis input to the X-basis prediction neural network to generate a prediction for the X-basis. The system can provide the Z-basis input to the Z-basis prediction neural network to generate a prediction for the Z-basis.

In some implementations, to generate a prediction in both bases, the system can generate multiple inputs to the same prediction neural network from the decoder state for the last updating time step. In some implementations, the last updating time step can include one time step that is the last time step of the multiple time steps. In some implementations, the last updating time step can include multiple time steps that include the last time step of the multiple time steps.

For example, the system can generate two inputs, where each of the two inputs are transposed versions of each other input. The system can process each input using the prediction neural network to generate a score that indicates whether an error of a particular type occurred. For example, the prediction neural network can be trained to make predictions over horizontal lines. The system can generate an input for the X-basis, for example, that runs horizontally. The system can generate an input for the Z-basis that is a transposed version of the input for the X-basis so that the vertical lines are now horizontal lines. The system can use the prediction neural network to generate a score for the input for the X-basis. The system can also use the prediction neural network to generate a score for the input for the Z-basis. The prediction neural network still makes predictions for horizontal lines, but the horizontal lines in the input for the Z-basis now correspond to what were vertical lines in the decoder state representation.

In some implementations where the system can generate multiple inputs to the same prediction neural network and the prediction neural network receives an input that includes a final embedding for undefined off-basis stabilizers and a linear projection for on-basis computed stabilizers, the system can include a learned basis embedding vector in the input to the prediction neural network. For example, the learned basis embedding vector can indicate that the input is for the X-basis, or the input is for the Z-basis.

In some implementations, to generate a prediction for both bases, the system can include a model for each basis. Each model can include an embedding engine, a state-updating neural network, and/or a prediction neural network that has been trained for the model. For example, the system can include an X-basis model and a Z-basis model. The system can thus have two processes running at the same time to make predictions for both types of errors. That is, the system can initialize a second decoder state that represents information about the multiple stabilizer qubits. For each updating time step, the system can generate a second intermediate representation that includes, for each of the stabilizer qubits, one or more second embeddings representing the respective feature for the stabilizer qubit at the one or more time steps corresponding to the updating time step. For each updating time step, the system can process a second time step input through a second state-updating neural network to generate a second decoder state for the updating time step. The second time step input can include the second intermediate representation for the updating time step and the second decoder state for a preceding updating time step. The system can then generate a second prediction of whether an error occurred in the computation from the second decoder state for the last updating time step of the plurality of time steps, as described above.

In some implementations, the system can perform ensembling and/or postselection as described above with reference to FIG. 3. In some implementations, the system can use techniques to speed up the decoding time as described above with reference to FIG. 3. In some implementations, the system can run on a specific hardware implementation and/or leverage parallel processing as described above with reference to FIG. 3.

Figure 5:
FIG. 5 is a diagram of an example process for detecting errors in a computation performed by a quantum computer that includes multiple data qubits.

FIG. 5 is a diagram of an example process 500 for detecting errors in a computation performed by a quantum computer that includes multiple data qubits. FIG. 5 shows the system 100 of FIG. 1 at multiple updating time steps, such as updating time steps 0, 1, 2 . . . . N−1, and N. In the example process 500, each updating time step corresponds to one time step. In some implementations, each updating time step can correspond to one or more time steps.

FIG. 5 shows the surface code layout 510 at multiple updating time steps. The surface code layout 510 is an example layout such as the layout 200 of FIG. 2. The surface code layout 510 includes multiple data qubits and stabilizer qubits.

The system 100 can initialize a decoder state 530. The decoder state 530 at updating time step 0 can include a zero vector for each stabilizer. That is, the decoder state 530 at updating time step 0 may not include information about the stabilizer qubits.

The system 100 can obtain error correction data 520. For example, the system can obtain the error correction data 520 from the stabilizer qubits of the surface code layout 510 for each time step. The error correction data 520 can include features of the stabilizer qubits. In some implementations, the error correction data 520 can include measurements. In some implementations, the error correction data 520 can include binary events, or temporal differences of binary measurements of the state of the stabilizer qubits. In some implementations, the error correction data 520 can include measurements and events. Obtaining error correction data 520 that includes both measurements and events can provide better results and more stable training. Other types of error correction data 520 are discussed in further detail below with reference to FIG. 6.

The system 100 can generate an intermediate representation 540 for each updating time step. The intermediate representation 540 can include one or more embeddings for each of the features for the stabilizer qubit at the one or more time steps corresponding to the updating time step in the error correction data. The system 100 can use an embedding engine 535 such as "StabilizerEmbedder" to generate the intermediate representation 540, for example. The embedding engine 535 is described in further detail below with reference to FIG. 6.

The system can process the intermediate representation 540 and the decoder state 530 through a state-updating neural network 550. For example, the state-updating neural network 550 can be a Transformer neural network.

At updating time step 0, the decoder state 530 includes a zero vector for each stabilizer. At updating time steps 1, 2 . . . . N−1, N, the decoder state 530 includes a vector representation for each stabilizer qubit. The decoder state 530 is an inductive bias that the state-updating neural network 550 can use to model the state of the layout 510. In some implementations, the decoder state 530 includes a vector representation for each data qubit. For example, the decoder state 530 can represent the probabilities of states of data qubits. In some implementations, the decoder state 530 includes a vector representation for each stabilizer qubit and data qubit. In some implementations, the decoder state 530 includes a vector representation for the grid. In some implementations, the decoder state 530 includes a vector representation for each line in the grid. For each updating time step except updating time step 0, the state-updating neural network 550 processes the intermediate representation 540 for the updating time step and the decoder state 530 for a previous updating time step.

The state-updating neural network 550 updates the decoder state 530 for the updating time step. An example state-updating neural network 550 that is a Transformer neural network is described in further detail below with reference to FIG. 7. In some implementations, the state-updating neural network 550 can be an RNN, or another type of neural network such as a graph network. In some implementations, the system can include multiple neural networks. For example, the system can include a hierarchical model that includes multiple models that make respective predictions for multiple subsets of the layout 510, and combines multiple models to make a final prediction for the layout 510. For example, the hierarchical model can include a convolutional neural network (CNN) pyramid or a U-net to process data at different spatial resolutions.

The system can generate a prediction 570 of whether an error occurred in the computation from the decoder state 530 for the last updating time step N. For example, the system can use a prediction neural network 560 to generate a probability that an error occurred in the computation. The prediction neural network 560 is described in further detail below with reference to FIG. 10.

FIG. 6 is a diagram of an example embedding engine 600 for generating an intermediate representation for each updating time step. For example, the embedding engine 600 can be the "StabilizerEmbedder" of FIG. 5.

The embedding engine 600 can generate an intermediate representation "$S_{ni}$" 540 for each updating time step n and each stabilizer i. In implementations where each updating time step corresponds to one time step, the intermediate representation 540 can include, for each stabilizer qubit, an embedding of the feature for the stabilizer qubit at the time step. In implementations where each updating time step can correspond to more than one time step, the intermediate representation 540 can include, for each stabilizer qubit, an embedding of the feature for the stabilizer qubit over all of the time steps corresponding to the updating time step. In other implementations where each updating time step can correspond to more than one time step, the intermediate representation 540 can include, for each stabilizer qubit, multiple embeddings of the feature, where each embedding represents the feature for the stabilizer qubit at each time step that corresponds to the updating time step. For example, the embedding engine 600 can generate embeddings for the stabilizer qubits. For example, the embeddings can be linear embeddings 610.

The embedding engine 600 can receive different types of features for each stabilizer. For example, the embedding engine 600 can receive "$Measurement_{ni}$" that can include, for example, binary parity measurements or analog measurements.

The embedding engine 600 can generate linear projections of each of the features such as "$Measurement_{ni}$" and sum the linear projections. The embedding engine 600 can also add a learned input embedding of the stabilizer index i to allow the system 100 to distinguish between the stabilizers.

The embedding engine 600 can process the linear projections and embedding of the stabilizer index i through a residual network 630 to generate the intermediate representation 540. For example, the residual network 630, "ResNet," can be a two-layer residual network. Thus, each stabilizer i at updating time step n is represented by a combination of linear embeddings as well as a learned position embedding of the stabilizer index, processed separately through a residual network 630. For example, the learned position embedding of each stabilizer index can map coordinates of the stabilizer qubit associated with the stabilizer index to an embedding vector.

In implementations where the system is trained to make predictions for multiple code distances, the set of learned position embeddings is large enough to accommodate the largest code distance that the system was trained to make predictions for. For example, the set of learned position embeddings can include embeddings for a large set of coordinates that include the largest code distance. In other implementations where the system is trained to make predictions for multiple code distances, the learned position embedding can include separate sets of embeddings for each code distance.

In some implementations, the embedding engine 600 can obtain a positional embedding for each stabilizer qubit characterizing a position of the stabilizer qubit within the quantum computer. The embedding engine 600 can process the embeddings of the stabilizer qubits and the respective positional embeddings for the stabilizer qubits using an encoding neural network such as the residual network 630 to generate the intermediate representation 540 for the updating time step.

In some implementations, the embedding engine 600 can receive "Measurement$_{ni}$" that can include raw analog measurements. In some implementations, the embedding engine 600 can receive normalized versions of raw analog measurements. The embedding engine 600 can also receive posterior probabilities of a stabilizer measurement given the analog measurements. Raw analog measurements can provide more information than traditional binary measurements. For example, in some quantum computing architectures, there is analog data with information about uncertainty and leakage to non-computational states. For example, for superconducting qubits, a microwave pulse can be used to probe the frequency of a superconducting resonator that is coupled to a qubit in order to infer the qubit's state. The outcoming microwave signal contains information in its amplitude and phase, traditionally represented in a two-dimensional space of in-phase ("I") and quadrature ("Q") amplitudes. Thus for each stabilizer qubit, the embedding engine 600 can receive, instead of a binary value (0 if the most likely state is $|0\rangle$, 1 if $|1\rangle$), the raw analog I/Q measurements, or the probability of being in state $|1\rangle$, based on a decay model parameterized by the signal-to-noise ratio (SNR) and normalized decay time t. The system can approximate the probability using a Gaussian model, for example.

The embedding engine 600 can also receive a time series of analog measurements of the corresponding subset of data qubits for a period of time that ends at the time step. For example, within a period of time that starts at a previous time step and ends at the time step, the embedding engine 600 can obtain a trajectory of stabilizer measurements over the period. The trajectory of stabilizer measurements can indicate information such as whether the measurement started out very clearly at a 1 and changed to 0 over the time step, or whether the trajectory of the measurement meandered during the time step. The time series of analog measurements can provide more information about the behavior of the data qubits than traditional binary measurements.

The embedding engine 600 can also receive "Event$_{ni}$" that represents stabilizer events, or temporal differences of binary stabilizer measurements of the stabilizer state for the stabilizer qubit. For example, an event can be derived through an XOR operation between a current stabilizer state and a prior stabilizer state.

The embedding engine 600 can also receive "Leakage$_{ni}$" that represents leakage data, which characterizes leakage of the corresponding subset of data qubits for the stabilizer that can include, for example, a leakage probability. The embedding engine 600 can also receive "Event leakage$_{ni}$" that includes the temporal-difference analog of leakage measurements. Leakage occurs in superconducting qubits when a data qubit is excited into a high energy state (e.g., $|2\rangle$, $|3\rangle$) that is long-lived and mobile. This can lead to correlated errors in space and time. Leakage in a logical qubit surface code can lead to additional errors in the system. It is possible to distinguish these states in the I/Q representation, though since traditional decoders cannot handle leakage, they are usually ignored and collapsed to $|0\rangle$ or $|1\rangle$. The embedding engine 600 can receive a binary input of leaked or not leaked, or probability of leakage in addition to a conditional probability of being in $|1\rangle$, given the measurement was not in a leaked state.

In some implementations, the embedding engine 600 can receive experimental data such as the temperature measurements of the circuit or calibration information. Calibration information can include information generated before the computation that indicates whether some data qubits are more noisy than others, for example. In some implementations, the embedding engine 600 can receive data that represents which qubits on a chip are being used for a particular logical qubit. The experimental data and calibration information can lead to improved accuracy compared to processing stabilizer measurements or stabilizer features alone.

In some implementations, the embedding engine 600 can use a separate embedding for the final time step. For example, in some implementations, at the last time step, the stabilizer features are not obtained from the stabilizer qubits but are derived from the data qubits. The stabilizer features for the final time step can include stabilizer features computed from the data qubits. Thus at the final time step, the embedding engine uses a separate final embedding with a learned embedding for all the undefined off-basis stabilizers and a separate linear projection for the on-basis computed stabilizers.

In some implementations, for the last time step, the system uses a different state-updating neural network or a state-updating neural network with different parameters to process the stabilizer measurements for the final time step and the decoder state for the final time step.

Figure 7:
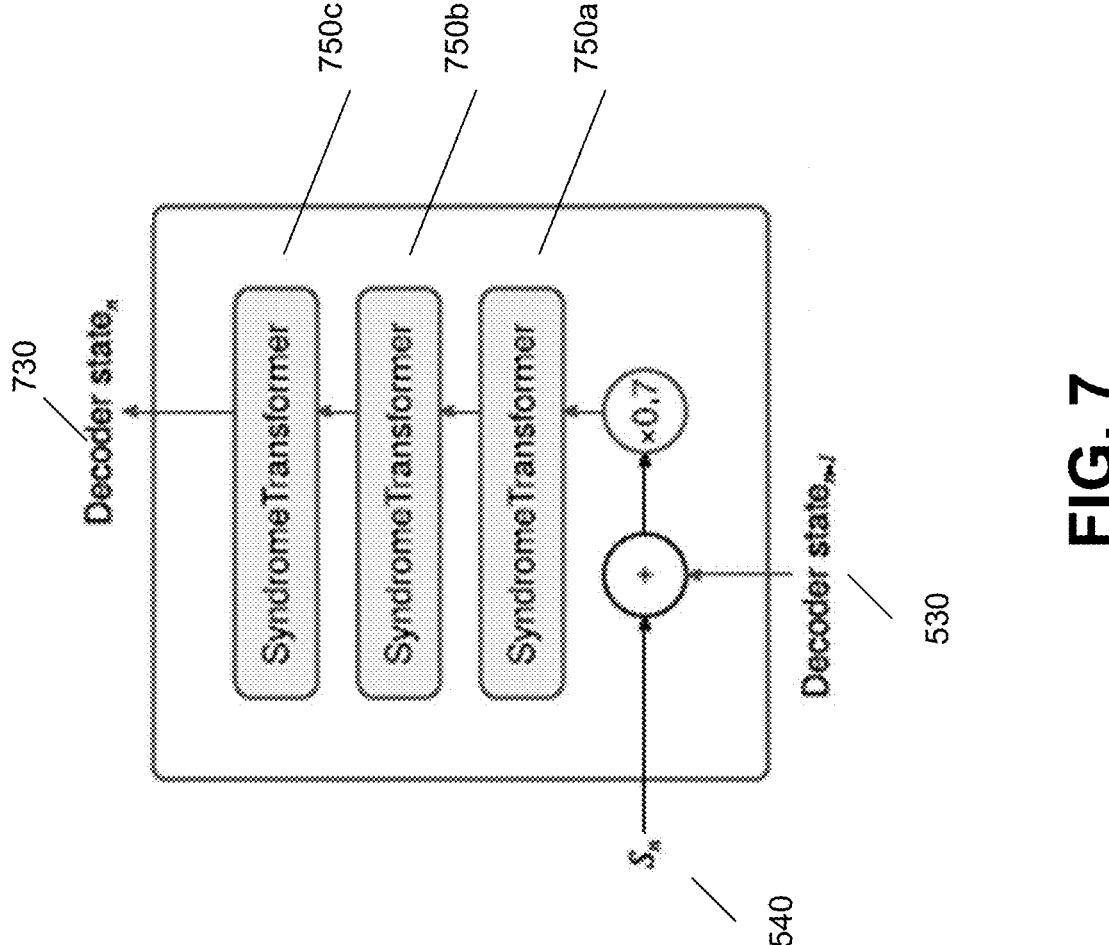
FIG. 7 is a diagram of an example Transformer neural network.

FIG. 7 is a diagram of an example Transformer neural network 700. For example, the Transformer neural network 700 can be an example of the state-updating neural network 550 of FIG. 5. For each updating time step, the Transformer neural network 700 receives the intermediate representation of the stabilizers at the updating time step "S$_n$" 540 and the decoder state 530 for the previous updating time step. At updating time step 0, the decoder state 530 includes zero vectors for each stabilizer qubit, for example. The Transformer neural network 700 can add the intermediate representation 540 to the decoder state 530 for the previous updating time step.

The Transformer neural network 700 includes one or more Transformer layers 750 that receive the intermediate representation 540 and the decoder state 530. For example, FIG. 7 shows three Transformer layers, "Syndrome Transformer" 750$a$, "SyndromeTransformer" 750$b$, and "SyndromeTransformer" 750$c$. Each Transformer layer 750 updates the decoder state 530. Each Transformer layer 750 can update the decoder state 530 through multi-head attention modulated by a learned attention bias, followed by a dense block and convolution as described below with reference to FIG. 8.

FIG. 8 is a diagram of an example Transformer layer 800. For example, the Transformer layer can be one of the Transformer layers 750 of FIG. 7. The Transformer layer 800 can have a self-attention architecture based on a Transformer. The Transformer layer 800 receives a time step input 805 that includes an intermediate representation and the current decoder state. The Transformer layer 800 updates the decoder state through multi-head attention modulated by a learned attention bias.

The Transformer layer 800 includes a self-attention layer 810. The self-attention layer 810 includes one or more self-attention heads that each generate an output for each stabilizer qubit. Each self-attention head can generate an output using a process such as process 900 of FIG. 9. The Transformer layer 800 can concatenate the outputs for each head together and project the concatenated outputs to obtain an updated decoder state.

The self-attention layer 810 can perform global attention, where each stabilizer qubit attends to each other stabilizer qubit. The self-attention layer 810 receives an attention bias 815. The attention bias modulates the attention between each stabilizer i, j. The attention bias 815 embeds fixed information about the layout and connectivity of the stabilizer qubits. The attention bias includes a learned embedding for each stabilizer pair i, j. For example, the attention bias embedding can be a $(d^2-1) \times (d^2-1) \times 48$ tensor constructed by adding learned embeddings of discrete features for each stabilizer pair i, j. The embedding can be learned separately for each head. The embedding is independent of the decoder state at the updating time step. At each Transformer layer 800, the attention bias 815 is projected down to a bias per head to be added to conventional content-based attention logits. The self-attention layer can thus modulate the attention between each stabilizer i, j by adding the attention bias to conventional content-based attention logits to generate final attention logits.

In some examples, each head can perform distinct attention functions. For example, a first head can bias attention towards the same stabilizer and stabilizers far away in the grid. A second head can discourage attention to immediate neighboring stabilizers while encouraging attention to non-neighboring stabilizers. A third head can strongly encourage local attention while discouraging attention to stabilizers farther away. A fourth head can predominantly discourage attention to the same stabilizer while being slightly encouraging towards attention for non-same stabilizers.

In some implementations, the self-attention layer 810 can perform masked attention. The self-attention layer 810 can use masked attention to simulate local attention. For example, the self-attention layer 810 can mask a subset of the final attention logits so that each stabilizer qubit can attend only to nearby stabilizer qubits. For example, after masking a subset of the final attention logits, for each stabilizer, only final attention logits for pairs of stabilizer qubits within a local neighborhood of the stabilizer qubit are non-zero.

The Transformer layer 800 can include a feed-forward layer 820. The feed-forward layer 820 can be a "Gated dense block," for example. The "Gated dense block" can be a variant of a position-wise feed-forward layer of a conventional Transformer. The feed-forward layer can apply an activation function to the output of the self-attention layer 810. For example, the activation function can include tan h, sigmoid, RELU, ELU, GELU, Swish, etc.

The Transformer layer 800 also includes one or more convolutional layers that apply convolutions over a spatial grid of outputs of the feed-forward layer for the stabilizer qubits. The Transformer layer 800 can use an operation such as "Scatter to 2D" 830 to arrange the outputs within the spatial grid according to positions of the corresponding stabilizer qubits within the quantum computer. In some implementations, the grid can include a learned padding vector for positions where there is no stabilizer qubit. The Transformer layer 800 can then perform dilated convolutions, "Dilated convs" 840, that support longer-range information passing and "Gather from 2D" 850 to update the decoder state.

In some implementations, the Transformer layer 800 can perform axial attention in addition to spatial attention. For example, the Transformer layer 800 can receive a representation of the stabilizer qubits for a batch of multiple updating time steps. Each stabilizer qubit can attend to itself over the multiple updating time steps in the batch. In some implementations, the Transformer layer 800 can alternate between spatial attention and axial attention. For example, the decoder state in these implementations can include a representation for each stabilizer for each updating time step. For example, the representation for each stabilizer for each updating time step can be maintained in an N×R matrix, where Nis the Nis the number of stabilizers and R is the number of updating time steps. A horizontal line in the matrix can include a representation of each stabilizer for one updating time step. A vertical line in the matrix can include a representation for the stabilizer for each updating time step in the multiple updating time steps. To perform spatial attention, the Transformer layer 800 can perform attention across the matrix horizontally so that each stabilizer representation attends to other stabilizers at the same updating time step. To perform axial attention, the Transformer layer 800 can perform attention across the matrix vertically so that each stabilizer representation attends to the representation of the same stabilizer but across updating time steps.

In some implementations, the Transformer layer 800 can perform attention backwards and forwards in time. In these implementations, the Transformer layer 800 can perform attention forwards in time by including stabilizer features from a batch of multiple updating time steps in the decoder state, and then performing axial attention.

In some implementations, the Transformer layer 800 can perform causal attention so that each stabilizer representation can attend only to previous representations in time. For example, the attention can be masked so that the Transformer layer 800 performs attention across the grid vertically for previous updating time steps. For example, the Transformer layer 800 can mask a subset of the attention logits that correspond to stabilizer features from future updating time steps in the batch of multiple updating time steps, so that only attention logits for previous updating time steps are non-zero.

In implementations where the decoder state includes an N×R matrix, the prediction neural network can make a prediction by pooling over the N stabilizer representations for the final updating time step R. In some implementations, the prediction neural network can pool over the entire N×R matrix to make a prediction.

In some implementations, the Transformer layer 800 can perform attention between representations of the data qubits. In some implementations, the Transformer layer 800 can perform attention between different representations such as between a global representation of the grid and stabilizer representations, or between qubit representations and stabilizer representations. In these implementations, the Transformer layer 800 can perform other processing operations such as convolutions on representations of the data qubits.

In some implementations, the system can perform sparse attention to reduce the computational burden of performing attention. For example, the attention heads can be factorized attention heads.

FIG. 9 is a flow diagram of an example process 900 for generating an output for each stabilizer qubit. The process 900 can be performed by each self-attention head in the self-attention layer 810 of FIG. 8.

Each head can obtain an input to the self-attention layer (step 910). The input can include at least a respective embedding of the respective feature for each stabilizer qubit for the updating time step.

Each head can map the embedding of the respective feature for each stabilizer qubit to queries, keys, and values of the head (step 920). For example, each head can map the embedding of the respective feature for each stabilizer qubit to queries, keys, and values using a learned transformation.

Each head can compute initial attention logits (step 930). Each initial attention logit can represent a measure of dependency between stabilizer qubits using the queries and the keys. Each initial attention logit can correspond to a pair of stabilizer qubits. For example, each initial attention logit can be computed using a dot product of the queries and the keys.

Each head can add, to each initial attention logit, a respective attention bias to generate respective final attention logits (step 940). Each attention bias can be generated by applying a projection into an embedding characterizing the corresponding pair of stabilizer qubits for the initial attention logit. The embedding can be constructed by combining, e.g., adding or concatenating, learned embeddings of discrete features for each stabilizer qubit pair i, j. The attention bias can represent a fixed interdependence of different stabilizer qubits as a function of their connectivity or spatial proximity, for example. The system can use the attention bias to learn what types of information is important and thus how much each stabilizer should attend to another stabilizer.

In some implementations, the embedding can characterize a spatial distance between each stabilizer qubit in the pair of stabilizer qubits i, j. For example, the embedding can characterize the spatial coordinates of stabilizer i and stabilizer j. As another example, the embedding can characterize the spatial offset of stabilizer i from stabilizer j. As another example, the embedding can characterize the Manhattan distance between stabilizer i and stabilizer j.

In some implementations, the embedding can characterize a similarity between a type of each stabilizer qubit in the pair of stabilizer qubits. For example, the embedding can include a bit that indicates if the bases for stabilizer i and stabilizer j are the same or not.

In implementations where the system is trained to make a prediction for multiple code distances, the embedding is large enough to accommodate the largest code distance that the system was trained to make a prediction for. In other implementations where the system is trained to make a prediction for multiple code distances, the embedding can include a separate set of parameters for each code distance.

The learned embeddings can be passed through a residual network to form the embedding. Thus, after training, the embedding is constant and can be precomputed. In some implementations, the embedding is shared among each self-attention head of each self-attention layer. Each self-attention head of each self-attention layer can apply a different, learned projection to the shared embedding to generate the attention bias for the corresponding pair of stabilizer qubits.

In some implementations, the embedding can characterize a temporal relationship between each stabilizer qubit in the pair of stabilizer qubits. In implementations where each updating time step corresponds to one time step, the embedding can characterize a temporal relationship between a current and previous time step, for example. In implementations where each updating time step can correspond to more than one time step, the temporal relationship can characterize a temporal relationship between a current and previous updating time step. For example, the embedding can be an aggregated embedding generated from individual embeddings for each time step corresponding to the updating time step.

As an example, to characterize a temporal relationship between each stabilizer qubit in the pair of stabilizer qubits, for each time step the current and previous stabilizer features can be used to compute indicator features for spatial and time-space event correlations for each i, j pair. For example, for an updating time step n, the indicator features can include $event_{ni} \times event_{nj}$, $event_{ni} \times event_{(n-1)j}$, $event_{(n-1)i} \times event_{(n)j}$, and $event_{(n-1)i} \times event_{(n-1)j}$. The indicator features can also include the products of the diagonals, i.e., copies of the matrices where all non-diagonal elements are set to zero, of $event_{ni}$, $event_{nj}$, $event_{(n-1)j}$, and $event_{(n-1)i}$. These indicator features can be concatenated to the attention bias embedding and directly projected with a learned projection.

Each head can generate a respective attention weight from each final attention logit (step 950). For example, each head can generate a respective attention weight from each final attention logit by applying softmax to the final attention logit, divided by the square root of the dimensionality of the keys.

Each head can generate, for each stabilizer qubit, an output for the stabilizer qubit (step 960). For example, each head can compute a weighted sum of the values. The values can be weighted by the corresponding attention weights. The outputs for each head can be different, and thus each head can perform different attention functions, as described with more detail with respect to FIG. 8.

Figure 10:
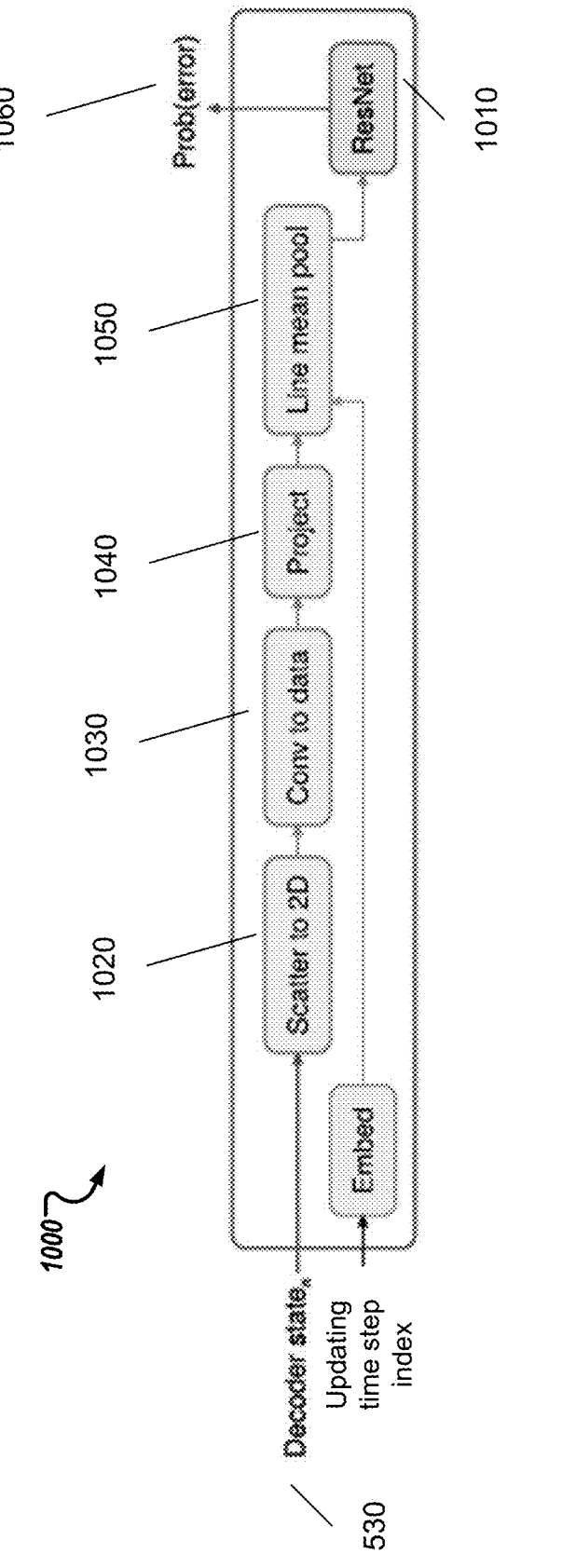
FIG. 10 is a diagram of an example prediction neural network.

FIG. 10 is a diagram of an example prediction neural network 1000. The prediction neural network can be the prediction neural network 560 of FIG. 5, for example. The prediction neural network 1000 can process the decoder state for the final updating time step to make a final prediction. The prediction neural network 1000 can include a prediction head 1010.

The system can generate an input, from the decoder state for the last updating time step, to the prediction neural network 1000. For example, the input can include the decoder state 530 for the last updating time step. The input can also include data representing the index of the time step.

In implementations where each updating time step corresponds to one time step, the input can include the decoder state 530 for the last time step. In some implementations where each updating time step can correspond to more than one time step, the input can include the decoder state for the last updating time step. In some implementations where each updating time step can correspond to more than one time step, the input can include the decoder state from the last time step of the time steps that correspond to the last updating time step. In other implementations where the last updating time step corresponds to the last time step of the time steps, the input can include the decoder state of the last updating time step.

The prediction neural network 1000 can process the input to generate a score that indicates whether an error occurred. For example, the prediction neural network 1000 can transform the per-stabilizer representation of the decoder state 530 to a per-data-qubit representation. For example, the prediction neural network 1000 can use "Scatter to 2D" 1020 to scatter the decoder state 530 to a 2D representation.

The scatter operation can arrange the decoder state 530 according to the spatial layout of the stabilizer qubits. The prediction neural network 1000 can then apply a "Conv to data" 1030 operation. For example, the prediction neural network 1000 can apply a 2×2 convolution which combines information from the four stabilizer qubit neighbors of each data qubit. The per-stabilizer representation of the decoder state 530 is now a per-data-qubit representation.

The prediction neural network 1000 can transform the per-data-qubit representation to a per-line representation. For example, the representation per data qubit can be pooled into a representation per-row or column of data qubits (representing logical observable $X_L$ or logical observable $Z_L$, respectively). The prediction neural network 1000 can apply a projection, "Project" 1040 to reduce the dimensionality. The prediction neural network 1000 can apply pooling along rows or columns of the data qubits. For example, the prediction neural network can perform pooling using "Line mean pool" 1050. The prediction neural network 1000 can pool along rows or columns to arrive at a vector representation per row or column. For example, the prediction neural network 1000 can pool along rows or columns of the data qubits perpendicular to the logical observable rows or columns, to arrive at a vector representation per equivalent logical observable.

In some implementations, the prediction neural network 1000 can embed the data representing the index of the updating time step from the input. In some implementations where each updating time step corresponds to one time step, the prediction neural network 1000 can embed the data representing the index of the time step from the input. The prediction neural network 1000 can process the data representing the index of the updating time step using the "Line mean pool" 1050 operation. Thus "Line mean pool" 1050 operation can also receive the embedding of the index of the updating time step. The prediction neural network 1000 can add the embedding of the index of the updating time step to the per-data-qubit representation, for example. The prediction neural network 1000 can decode differently according to the number of updating time steps. For example, the distribution of errors may change over the first few updating time steps, and eventually reach a steady state with a larger number of updating time steps. In these implementations, the prediction neural network 1000 can use a learned embedding layer to embed the index of the updating time step. For example, the learned embedding layer can include a separate embedding for each index. The learned embedding layer can be trained for updating time step indices up to 25, for example. At inference, for updating time steps with indices greater than 25, the learned embedding layer can use the embedding for index 25.

The input to the prediction head 1010 can include the vector representation per row or column. The prediction head 1010 can process the vector representation per row or column to make a final prediction 1060. The prediction head 1010 can be a residual network, "ResNet," for example.

The prediction 1060 can include a score that indicates whether an error occurred in the computation. For example, the prediction 1060 can include the probability of an error in the computation based on the row or column. In some implementations, the prediction head 1010 can generate a prediction 1060 for the first row or first column. In some implementations, the prediction head 1010 can generate a prediction for each of the rows or columns in the experiment basis.

In some implementations, the prediction neural network 1000 can combine the representations of the decoder state for the last updating time step, perform a pooling operation, and input the representation after pooling into a neural network that predicts a 0 or 1 output of whether an error occurred in the computation.

Figure 11:
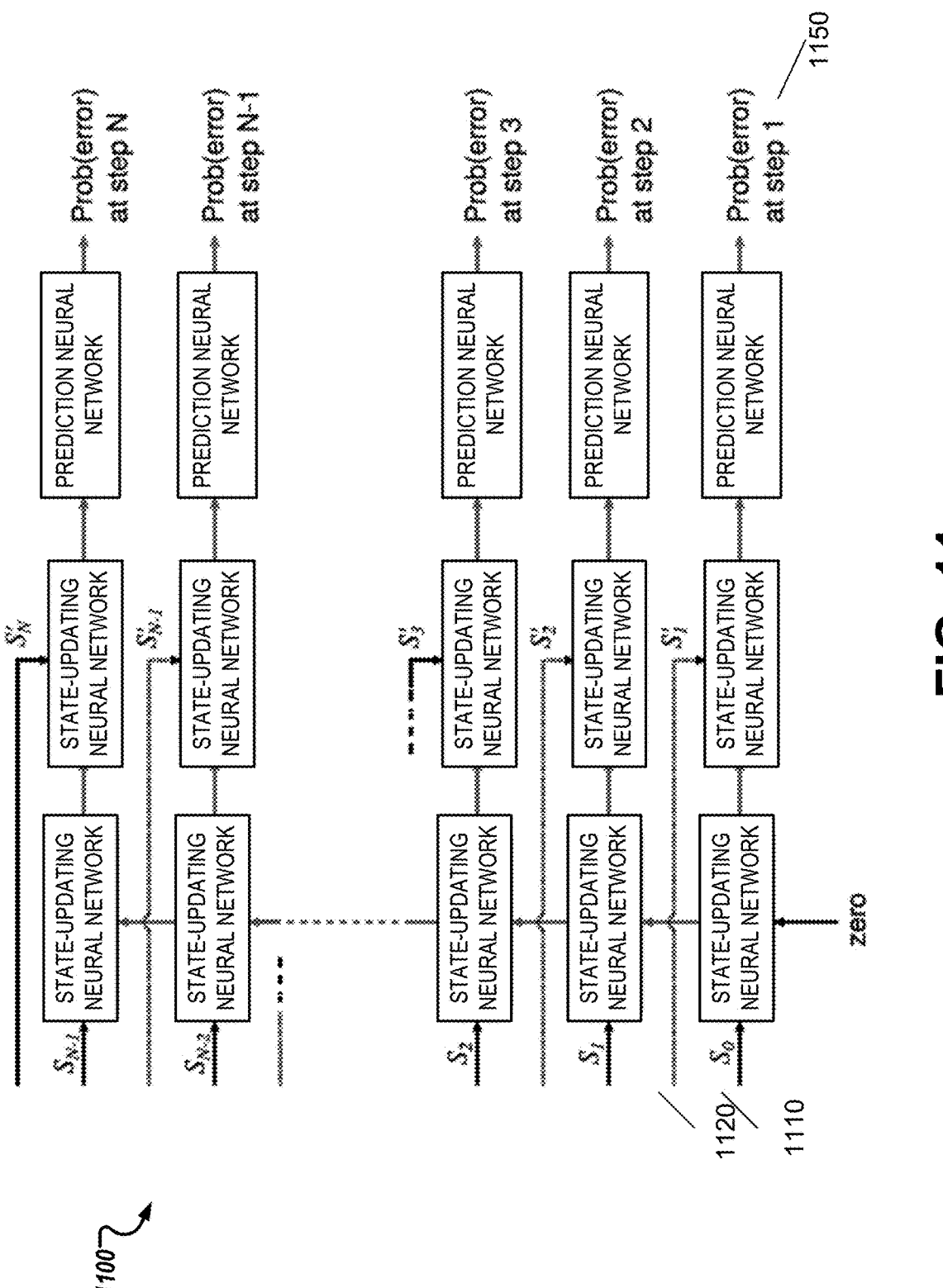
FIG. 11 is a diagram of an example process for predicting errors at every updating time step.

FIG. 11 is a diagram of an example process 1100 for predicting errors at every updating time step. The process 1100 can be performed by a system such as the system 100 of FIG. 1, where the system has been trained to predict errors at every updating time step. That is, each updating time step can have an associated label 1150. Obtaining a prediction at every updating time step can increase the amount of training targets available, thus improving the training process. For example, it can be easier for the system to be trained because the predictions for earlier updating time steps can have shorter backpropagation paths. By calling the simulator repeatedly with the same seed for increasing numbers of updating time steps, or through access to the internal simulator state, the system can perform a multi-updating time step computation with a shared bulk and a label for each round.

For example, in FIG. 11 every stabilizer qubit has a vector in the stabilizer representation "$S_n$" 1110. For each stabilizer representation 1110, the system determines a stabilizer representation 1120 "$S_n$" of the stabilizer representation in the next round. For example, the stabilizer representation 1120 can include embeddings that are computed using different embedding parameters and based only on the stabilizer qubits in the experiment basis computed from the final data qubit measurements.

Due to the special nature of the final stabilizers being computed from the measured data qubits, for each experiment length there is a set of final stabilizers for updating time step n which are different from the bulk stabilizers for updating time step n of experiments which last longer. With such simulated data, when training, a training system can share computation for these experiments of different lengths. For N updating time steps, N labels can be trained with 2N applications of the embedding and state-updating neural network, and N readout computations.

Generating a prediction at every updating time step can allow the system to train quickly and generalize well. For example, generating a prediction at every updating time step results in a larger number of labels, which a training system can backpropagate for training.

In some implementations, a training system can use a Bell-ancilla method to use the simulator to obtain intermediate labels more efficiently. For example, the training system can generate a label in both X and Z bases for each updating time step, along with the corresponding final stabilizer features.

Figure 12:
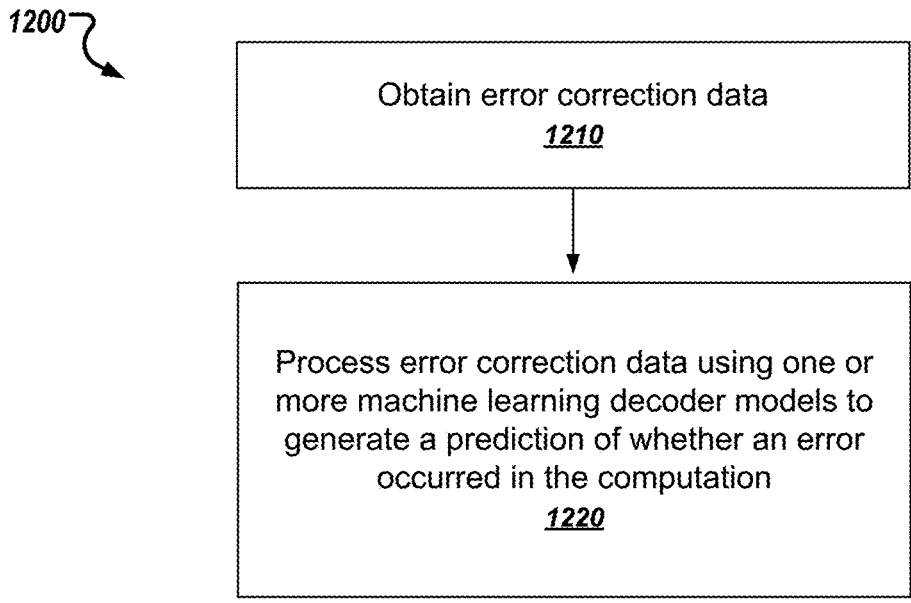
FIG. 12 is a diagram of an example process for detecting errors in a computation performed by a quantum computer that includes multiple data qubits.

FIG. 12 is a flow diagram of an example process 1200 for detecting errors in a computation performed by a quantum computer that includes multiple data qubits. For convenience, the process 1200 will be described as being performed by a system of one or more computers located in one or more locations. For example, the system 100 of FIG. 1, appropriately programmed in accordance with this specification, can perform the process 1200.

The system obtains error correction data (step 1210). The error correction data can include one or more analog measurements and one or more stabilizer events for each of multiple stabilizer qubits for each of multiple time steps during the computation. Each of the stabilizer qubits can correspond to a respective subset of the data qubits for the time step. For example, the analog measurements can include raw analog measurements.

In some implementations, the one or more analog measurements can include leakage data characterizing leakage of the corresponding subset of data qubits at the time step. In some implementations, the error correction data can include posterior probabilities of a stabilizer measurement given analog measurements of the corresponding subset of the data qubits at the time step. In some implementations, the error correction data can include a time series of analog measurements of the corresponding subset of data qubits for a period of time ending at the time step. In some implementations, the error correction data can include stabilizer events for one or more of the stabilizer qubits at the time step.

The system processes the error correction data using one or more decoder models to generate a prediction of whether an error occurred in the computation (step 1220). The one or more decoder models can be machine learning decoder models. For example, the system can process a respective input for each of multiple updating time steps. Each updating time step can correspond to one or more of the time steps.

The respective input for each of the multiple updating time steps can be generated from the error correction data for the corresponding one or more time steps. For example, the input to the machine learning decoder model at each updating time step can include the error correction data for the one or more time steps that correspond to the updating time step. In some implementations, the input can include data derived from the error correction data. For example, the system can derive data from the analog measurements of the error correction data and include the derived data in the input.

In some implementations, the one or more machine learning decoder models can include a Transformer neural network as described above with reference to FIGS. 7-8. In some implementations, the one or more machine learning decoder models can include an RNN. In some implementations, the one or more machine learning decoder models can include a graph network. In some implementations, the one or more machine learning decoder models can include a CNN. In some implementations, the one or more machine learning decoder models can include a U-net. In some implementations, the one or more machine learning decoder models can include an LSTM network. In some implementations, the one or more machine learning decoder models can include an MLP. In some implementations, the one or more machine learning decoder models can include an MLP-Mixer. In some implementations, the one or more machine learning models can include a combination of different types of neural networks.

In some implementations, the one or more machine learning decoder models are part of an ensemble of machine learning decoder models that each generate a respective prediction of whether an error occurred in the computation. The system can generate a final prediction from each of the respective prediction heads from each of the machine learning decoder models in the ensemble of machine learning decoder models. Ensembling is described above with reference to FIG. 3.

In some implementations, the computation can be part of a routine of a sequence of computations. In some implementations, the prediction of whether an error occurred in the computation is a probabilistic output. In some implementations, the system can determine the probabilistic output satisfies a threshold probabilistic output, and restart the routine at a first computation in the sequence of computations. Postselection is described above with reference to FIG. 3.

In some implementations where the computation is part of a routine and the prediction of whether an error occurred in the computation is a probabilistic output, the multiple data qubits are one set of multiple sets of data qubits. In these implementations, obtaining error correction data for each of multiple time steps during the computation includes obtaining error correction data for each set of data qubits. Processing a respective input for each of multiple updating time steps using one or more decoder models includes processing the respective input for each of the plurality of updating time steps for each set of data qubits using one or more decoder models corresponding to the set of data qubits to generate a respective prediction of whether an error occurred in the computation for the set of data qubits. Furthermore, the system can identify a prediction of the respective predictions for the sets of data qubits with the highest confidence. The system can perform a following computation in the sequence of computations using the set of data qubits that correspond to the identified prediction.

In some implementations, the multiple data qubits are one set of multiple sets of data qubits. In these implementations, obtaining error correction data for each of multiple time steps during the computation includes obtaining error correction data for each set of data qubits. Processing a respective input for each of multiple updating time steps using one or more decoder models includes processing the respective input for each of the plurality of updating time steps for each set of data qubits using one or more decoder models corresponding to the set of data qubits to generate a respective prediction of whether an error occurred in the computation for the set of data qubits. Each respective prediction is a probabilistic output. The system can identify a set of data qubits for which the corresponding prediction has a highest confidence. The system can thus use the set of data qubits to perform downstream tasks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method for detecting errors in a computation performed by a quantum computer comprising a plurality of data qubits, the method comprising:
   obtaining error correction data for each of a plurality of time steps during the computation, the error correction data for each time step comprising a respective feature for each of a plurality of stabilizer qubits that each correspond to a respective subset of the data qubits for the time step, wherein the respective feature for each of the stabilizer qubits comprises leakage data characterizing leakage of the corresponding subset of data qubits at the time step;
   initializing a decoder state that represents information about the plurality of stabilizer qubits; and
   for each of the plurality of time steps:
      generating an intermediate representation comprising, for each of the stabilizer qubits, a respective embedding of the respective feature for the stabilizer qubit at the time step; and
      processing a time step input through a Transformer neural network to update the decoder state for the time step, wherein the time step input comprises the intermediate representation for the time step and the decoder state for a preceding time step; and
      generating a prediction of whether an error occurred in the computation from the decoder state for the last time step of the plurality of time steps.

2. The method of claim 1, wherein the decoder state represents information about the plurality of data qubits.

3. The method of claim 1, wherein the respective feature for each of the stabilizer qubits is an analog measurement of the corresponding subset of data qubits at the time step.

4. The method of claim 1, wherein the respective feature for each of the stabilizer qubits comprises posterior probabilities of a stabilizer measurement given analog measurements of the corresponding subset of data qubits at the time step.

5. The method of claim 1, wherein the respective feature for each of the stabilizer qubits comprises a time series of analog measurements of the corresponding subset of data qubits for a period of time ending at the time step.

6. The method of claim 1, wherein the error correction data for each time step comprises stabilizer events for one or more of the stabilizer qubits at the time step.

7. The method of claim 1, wherein generating an intermediate representation comprising, for each of the stabilizer qubits, a respective embedding of the respective feature for the stabilizer qubit at the time step comprises:
   generating the respective embeddings for the stabilizer qubits for the time step;
   obtaining a respective positional embedding for each stabilizer qubit characterizing a position of the stabilizer qubit within the quantum computer; and
   processing the respective embeddings of the stabilizer qubits and the respective positional embeddings for the stabilizer qubits using an encoding neural network to generate the intermediate representation for the time step.

8. The method of claim 1, wherein generating a prediction of whether an error occurred in the computation from the decoder state for the last time step of the plurality of time steps comprises:
   generating, from the decoder state for the last time step, an input to a prediction neural network; and
   processing the input using the prediction neural network to generate a score that indicates whether an error occurred.

9. The method of claim 1, wherein the Transformer neural network comprises one or more Transformer layers, and wherein each Transformer layer comprises a self-attention layer and a feed-forward layer.

10. The method of claim 9, wherein each Transformer layer further comprises one or more convolutional layers that apply convolutions over a spatial grid of outputs of the feed-forward layer for the stabilizer qubits, wherein the outputs are arranged within the spatial grid according to positions of the corresponding stabilizer qubits within the quantum computer.

11. The method of claim 9, wherein the self-attention layer comprises one or more self-attention heads, and each self-attention head generates an output for each stabilizer qubit, wherein generating an output for each stabilizer qubit comprises:
   obtaining an input to the self-attention layer, wherein the input comprises at least a respective embedding of the respective feature for each stabilizer qubit at the time step;
   mapping the embedding of the respective feature for each stabilizer qubit to queries, keys, and values of the head;

computing initial attention logits that each represent a measure of dependency between stabilizer qubits using the queries and the keys, wherein each initial attention logit corresponds to a pair of stabilizer qubits;

adding, to each initial attention logit, a respective attention bias to generate respective final attention logits;

generating a respective attention weight from each final attention logit; and generating, for each stabilizer qubit, an output for the stabilizer qubit by computing a weighted sum of the values, wherein the values are weighted by the corresponding attention weights.

12. The method of claim 11, wherein, for each initial attention logit, the respective attention bias is generated by applying a projection into an embedding characterizing the corresponding pair of stabilizer qubits for the initial attention logit.

13. The method of claim 12, wherein the embedding characterizing the corresponding pair of stabilizer qubits characterizes a spatial distance between each stabilizer qubit in the pair of stabilizer qubits.

14. The method of claim 12, wherein the embedding characterizing the corresponding pair of stabilizer qubits characterizes a similarity between a type of each stabilizer qubit in the pair of stabilizer qubits.

15. The method of claim 12, wherein the embedding characterizing the pair of corresponding stabilizer qubits characterizes a temporal relationship between each stabilizer qubit in the pair of stabilizer qubits.

16. The method of claim 12, wherein the embedding characterizing the pair of corresponding stabilizer qubits is shared among each self-attention head of each self-attention layer.

17. The method of claim 16, wherein each self-attention head of each self-attention layer applies a different, learned projection to the shared embedding to generate the attention bias for the corresponding pair of stabilizer qubits.

18. The method of claim 11, further comprising masking a subset of the final attention logits so that, for each stabilizer, only final attention logits for pairs of stabilizer qubits within a local neighborhood of the stabilizer qubit are non-zero.

19. The method of claim 1, wherein the prediction of whether an error occurred in the computation comprises a respective prediction for each of a plurality of logical observables.

20. The method of claim 19, wherein generating a prediction of whether an error occurred in the computation comprises:

generating, from the decoder state for the last time step, a plurality of respective inputs to a plurality of prediction neural networks; and processing each respective input using the corresponding prediction neural network to generate a respective score that indicates whether an error for a particular logical observable occurred.

21. The method of claim 19, wherein generating a prediction of whether an error occurred in the computation comprises:

generating, from the decoder state for the last time step, a plurality of inputs to a prediction neural network, wherein each input is a transposed version of another input; and processing each input using the prediction neural network to generate a respective score that indicates whether an error for a particular logical observable occurred.

22. The method of claim 19, wherein the method further comprises:

initializing a second decoder state that represents information about the plurality of stabilizer qubits; and for each of the plurality of time steps:

generating a second intermediate representation comprising, for each of the stabilizer qubits, a second respective embedding of the respective feature for the stabilizer qubit at the time step; and processing a second time step input through a second Transformer neural network to generate a second decoder state for the time step, wherein the second time step input comprises the second intermediate representation for the time step and the second decoder state for a preceding time step; and generating a second prediction of whether an error occurred in the computation from the second decoder state for the last time step of the plurality of time steps.

23. A system comprising one or more computers and one or more storage devices storing instructions that when executed by the one or more computers cause the one or more computers to perform operations for detecting errors in a computation performed by a quantum computer comprising a plurality of data qubits, the operations comprising:

obtaining error correction data for each of a plurality of time steps during the computation, the error correction data for each time step comprising a respective feature for each of a plurality of stabilizer qubits that each correspond to a respective subset of the data qubits for the time step, wherein the respective feature for each of the stabilizer qubits comprises leakage data characterizing leakage of the corresponding subset of data qubits at the time step;

initializing a decoder state that represents information about the plurality of stabilizer qubits; and for each of the plurality of time steps:

generating an intermediate representation comprising, for each of the stabilizer qubits, a respective embedding of the respective feature for the stabilizer qubit at the time step; and processing a time step input through a Transformer neural network to update the decoder state for the time step, wherein the time step input comprises the intermediate representation for the time step and the decoder state for a preceding time step; and generating a prediction of whether an error occurred in the computation from the decoder state for the last time step of the plurality of time steps.

24. One or more non-transitory computer-readable storage media storing instructions that when executed by one or more computers cause the one or more computers to perform operations for detecting errors in a computation performed by a quantum computer comprising a plurality of data qubits, the operations comprising:

obtaining error correction data for each of a plurality of time steps during the computation, the error correction data for each time step comprising a respective feature for each of a plurality of stabilizer qubits that each correspond to a respective subset of the data qubits for the time step, wherein the respective feature for each of the stabilizer qubits comprises leakage data characterizing leakage of the corresponding subset of data qubits at the time step;

initializing a decoder state that represents information about the plurality of stabilizer qubits; and for each of the plurality of time steps:

generating an intermediate representation comprising, for each of the stabilizer qubits, a respective embedding of the respective feature for the stabilizer qubit at the time step; and processing a time step input through a Transformer neural network to update the decoder state for the time step, wherein the time step input comprises the intermediate representation for the time step and the decoder state for a preceding time step; and generating a prediction of whether an error occurred in the computation from the decoder state for the last time step of the plurality of time steps.

25. The system of claim 23, wherein generating an intermediate representation comprising, for each of the stabilizer qubits, a respective embedding of the respective feature for the stabilizer qubit at the time step comprises:

generating the respective embeddings for the stabilizer qubits for the time step;

obtaining a respective positional embedding for each stabilizer qubit characterizing a position of the stabilizer qubit within the quantum computer; and processing the respective embeddings of the stabilizer qubits and the respective positional embeddings for the stabilizer qubits using an encoding neural network to generate the intermediate representation for the time step.

* * * * *